US010504179B1

(12) United States Patent
McGuire et al.

(10) Patent No.: US 10,504,179 B1
(45) Date of Patent: Dec. 10, 2019

(54) SOCIAL AGGREGATED FRACTIONAL EQUITY TRANSACTION PARTITIONED ACQUISITION APPARATUSES, METHODS AND SYSTEMS

(71) Applicant: FMR LLC, Boston, MA (US)

(72) Inventors: Thomas McGuire, Galway (IE); Amanda Chiu, San Francisco, CA (US); Xinxin Sheng, Cary, NC (US); Jonathan Hromi, Watertown, MA (US); Raghav Chawla, Cambridge, MA (US)

(73) Assignee: FMR LLC, Boston, MA (US)

( * ) Notice: Subject to any disclaimer, the term of this patent is extended or adjusted under 35 U.S.C. 154(b) by 866 days.

(21) Appl. No.: 14/963,165

(22) Filed: Dec. 8, 2015

(51) Int. Cl.
*G06Q 40/04* (2012.01)
*G06Q 40/00* (2012.01)
*G06Q 40/06* (2012.01)

(52) U.S. Cl.
CPC .................... *G06Q 40/04* (2013.01)

(58) Field of Classification Search
CPC ........ G06Q 40/04; G06Q 40/00; G06Q 40/06; G06Q 40/025

(Continued)

(56) References Cited

U.S. PATENT DOCUMENTS 6,959,382 B1  10/2005  Kinnis
7,921,283 B2   4/2011  Hayes
(Continued)

FOREIGN PATENT DOCUMENTS

CA   2870844 A1   5/2015
CA   2843034 A1   8/2015
(Continued)

OTHER PUBLICATIONS

"NRGcoin: Virtual currency for trading of renewable energy in smart grids", Published in: 11th International Conference on the European Energy Market (EEM14) (pp. 1-6), Mihail Mihaylov • Sergio Jurado • Narcis Avellana • Kristof Van Moffaert • Ildefons Magrans de Abril • Ann Nowe, (see next page).*

(Continued)

*Primary Examiner* — Hai Tran
(74) *Attorney, Agent, or Firm* — Hanchuk Kheit LLP; Walter G. Hanchuk

(57) ABSTRACT

The Social Aggregated Fractional Equity Transaction Partitioned Acquisition Apparatuses, Methods and Systems, ("SAFETPA") transforms fractional equity ownership purchase request inputs via SAFETPA components into transaction confirmation outputs. A Fractional Order Generation component receives a purchase request for a fractional order of an equity via a data communication network interface from a client terminal of a client having a source of funds and having a public encryption key, determines a purchase price for the fractional order of the equity by retrieving a quote for a price of a share of the equity, confirms that the source of funds contains at least the purchase price; and generates a trade order for the share of the equity. A Fractional Order Placement component obtains the trade order from Fractional Order Generation Component, transmits the trade order to a trade execution server via the data communication network, and receives a confirmation of an execution of the trade order from the trade execution server via the data communication network. A Blockchain Recordation Component receives the confirmation from the Fractional Order Placement Component, records the confirmation, the fractional share and the public key of the client in a block data structure, records the block data structure in a blockchain, wherein each block data structure of the blockchain comprises a hash of a prior block data structure in the blockchain in order to secure the blockchain from tampering, and transmits the confirmation to the client terminal via the data communication network for display to the client.

30 Claims, 26 Drawing Sheets

SAFETPA—Network Environment

(58) Field of Classification Search
USPC .......................................................... 705/37
See application file for complete search history.

(56) References Cited

U.S. PATENT DOCUMENTS

| | | | |
|---|---|---|---|
| 9,076,290 B2 | 7/2015 | Griffin | |
| 9,082,113 B2 | 7/2015 | Shea et al. | |
| 9,087,326 B2 | 7/2015 | Shea et al. | |
| 9,098,190 B2 | 8/2015 | Zhou | |
| 9,098,387 B1 | 8/2015 | Curtis et al. | |
| 9,098,874 B2 | 8/2015 | Chandra et al. | |
| 9,117,341 B2 | 8/2015 | Marantelli | |
| 9,122,749 B2 | 9/2015 | Elmore et al. | |
| 9,129,338 B2 | 9/2015 | Liu | |
| 9,129,339 B2 | 9/2015 | Liu | |
| 9,135,616 B2 | 9/2015 | Hirson et al. | |
| 9,135,787 B1 | 9/2015 | Russell | |
| 9,144,742 B1 | 9/2015 | Curtis et al. | |
| 9,153,088 B2 | 10/2015 | Spencer, II | |
| 9,160,717 B2 | 10/2015 | Bhanoo et al. | |
| 9,407,617 B2 | 8/2016 | Mowers | |
| 10,068,228 B1* | 9/2018 | Winklevoss | G06Q 20/3829 |
| 2003/0191709 A1 | 10/2003 | Elston | |
| 2003/0217258 A1 | 11/2003 | Bade | |
| 2005/0222929 A1 | 10/2005 | Steier | |
| 2006/0236384 A1 | 10/2006 | Lindholm | |
| 2007/0215695 A1 | 9/2007 | Trane | |
| 2009/0106125 A1 | 4/2009 | Rock | |
| 2010/0165112 A1 | 7/2010 | Scanlon | |
| 2010/0185504 A1 | 7/2010 | Rajan | |
| 2012/0158586 A1 | 6/2012 | Ganti | |
| 2012/0215446 A1 | 8/2012 | Schunder | |
| 2013/0129080 A1 | 5/2013 | Tang | |
| 2013/0132219 A1 | 5/2013 | Liberty | |
| 2014/0052994 A1 | 2/2014 | Sabin | |
| 2014/0058862 A1 | 2/2014 | Celkonas | |
| 2014/0074497 A1 | 3/2014 | Griffin | |
| 2014/0095865 A1 | 4/2014 | Yerra | |
| 2014/0095878 A1 | 4/2014 | Shimano | |
| 2014/0114861 A1 | 4/2014 | Mages | |
| 2014/0188691 A1 | 7/2014 | Blank | |
| 2014/0195415 A1 | 7/2014 | Broberg | |
| 2015/0018084 A1 | 1/2015 | Gatto | |
| 2015/0195099 A1 | 7/2015 | Imes | |
| 2015/0205929 A1 | 7/2015 | Brama | |
| 2015/0206106 A1* | 7/2015 | Yago | G06Q 20/0658 705/68 |
| 2015/0206240 A1 | 7/2015 | Baker | |
| 2015/0213008 A1 | 7/2015 | Orsini et al. | |
| 2015/0213351 A1 | 7/2015 | Wyatt | |
| 2015/0213419 A1 | 7/2015 | Lyons et al. | |
| 2015/0213437 A1 | 7/2015 | Wyatt | |
| 2015/0220892 A1 | 8/2015 | Allen | |
| 2015/0220928 A1 | 8/2015 | Allen | |
| 2015/0227897 A1 | 8/2015 | Loera | |
| 2015/0227898 A1 | 8/2015 | Ballout | |
| 2015/0227913 A1 | 8/2015 | Ballout | |
| 2015/0245084 A1 | 8/2015 | Downing et al. | |
| 2015/0248672 A1 | 9/2015 | Bayer | |
| 2015/0254640 A1 | 9/2015 | Cassano et al. | |
| 2015/0254768 A1 | 9/2015 | Menon et al. | |
| 2015/0261269 A1 | 9/2015 | Bruscoe | |
| 2015/0262137 A1 | 9/2015 | Armstrong | |
| 2015/0262138 A1 | 9/2015 | Hudon | |
| 2015/0262139 A1 | 9/2015 | Shtylman | |
| 2015/0262140 A1 | 9/2015 | Armstrong | |
| 2015/0262141 A1 | 9/2015 | Rebernik et al. | |
| 2015/0262168 A1 | 9/2015 | Armstrong | |
| 2015/0262171 A1 | 9/2015 | Langschaedel et al. | |
| 2015/0262172 A1 | 9/2015 | Rebernik | |
| 2015/0262173 A1 | 9/2015 | Langschaedel et al. | |
| 2015/0262176 A1 | 9/2015 | Langschaedel et al. | |
| 2015/0262251 A1 | 9/2015 | Knobel | |
| 2015/0269538 A1 | 9/2015 | Stanchfield | |
| 2015/0269539 A1 | 9/2015 | MacGregor et al. | |
| 2015/0269541 A1 | 9/2015 | MacGregor et al. | |
| 2015/0269570 A1 | 9/2015 | Phan | |
| 2015/0271183 A1 | 9/2015 | MacGregor et al. | |
| 2015/0278820 A1 | 10/2015 | Meadows | |
| 2015/0286995 A1 | 10/2015 | Korosec | |
| 2015/0287026 A1 | 10/2015 | Yang et al. | |
| 2015/0294308 A1 | 10/2015 | Pauker et al. | |
| 2015/0294424 A1 | 10/2015 | Hakim | |
| 2015/0294425 A1 | 10/2015 | Benson | |
| 2015/0302357 A1 | 10/2015 | Chandra | |
| 2015/0302400 A1 | 10/2015 | Metral | |
| 2015/0302401 A1 | 10/2015 | Metral | |
| 2015/0302441 A1 | 10/2015 | Katsuyama et al. | |
| 2015/0302446 A1 | 10/2015 | Park et al. | |
| 2015/0358161 A1 | 12/2015 | Kancharla | |
| 2016/0019522 A1 | 1/2016 | Granbery | |
| 2016/0073279 A1 | 3/2016 | Johnson | |
| 2016/0085955 A1 | 3/2016 | Lerner | |
| 2016/0086175 A1 | 3/2016 | Finlow-Bates | |
| 2016/0119318 A1 | 4/2016 | Zollinger | |
| 2016/0162897 A1 | 6/2016 | Feeney | |
| 2016/0210632 A1 | 7/2016 | Li | |
| 2016/0269182 A1 | 9/2016 | Sriram | |
| 2016/0321751 A1* | 11/2016 | Creighton, IV | G06Q 40/04 |
| 2017/0228822 A1* | 8/2017 | Creighton, IV | G06Q 40/04 |
| 2018/0211318 A1* | 7/2018 | Parikh | G06Q 40/04 |

FOREIGN PATENT DOCUMENTS

| | | | |
|---|---|---|---|
| CA | 2845648 | A1 | 9/2015 |
| EP | 2820797 | A1 | 1/2015 |
| EP | 2831823 | A1 | 2/2015 |
| EP | 2874112 | A1 | 5/2015 |
| EP | 2896001 | A1 | 7/2015 |
| WO | 2008065345 | A1 | 6/2008 |
| WO | 2012142521 | A2 | 10/2012 |
| WO | 2013003604 | | 2/2013 |
| WO | 20130080333 | | 3/2013 |
| WO | 2013078990 | A1 | 6/2013 |
| WO | 20140006780 | | 1/2014 |
| WO | 2014201059 | A1 | 12/2014 |
| WO | 2015004820 | A1 | 1/2015 |
| WO | 2015016356 | A1 | 2/2015 |
| WO | 2015024129 | A1 | 2/2015 |
| WO | 2015051692 | A1 | 4/2015 |
| WO | 2015058282 | A1 | 4/2015 |
| WO | 2015059669 | A1 | 4/2015 |
| WO | 2015077378 | A1 | 5/2015 |
| WO | 2015085393 | A1 | 6/2015 |
| WO | 2015095761 | A1 | 6/2015 |
| WO | 201506285 | A1 | 7/2015 |
| WO | 2015113519 | A1 | 8/2015 |
| WO | 2015116998 | A2 | 8/2015 |
| WO | 2015120606 | A1 | 8/2015 |
| WO | 201534890 | A1 | 9/2015 |
| WO | 2015135018 | A1 | 9/2015 |
| WO | 2015142765 | A1 | 9/2015 |
| WO | 2015143068 | A1 | 9/2015 |
| WO | 2015144971 | A1 | 10/2015 |
| WO | 2015148725 | A2 | 10/2015 |
| WO | 2016025990 | | 2/2016 |

OTHER PUBLICATIONS

Last update date: Aug. 8, 2014, Publication date: May 1, 2014, Electronic publication date: Jul. 18, 2014, ISBN (Electronic): 978-1-4799-6095-8, ISSN (Electronic): 2165-4093.*
Third party submission filed in related U.S. Appl. No. 14/799,242.
International Search Report for PCT application No. PCT/US2016/042169 filed on Jul. 13, 2016.
"Automated Verification of Electrum Wallet", Mathieu Turuani et al, from HAL archives-Ouverte. Fr, submitted on Jan. 14, 2016.

* cited by examiner

Fig. 1: SAFETPA—Network Environment

Fig.2: SAFETPA—General Flow

Fig.3: SAFETPA—Blockchain entry

Fig.4: SAFETPA—Logic Flow

Fig.5: SAFETPA—Virtual Currency Transaction Datagraph

Fig.6: SAFETPA—Blockchain generation

Fig.7: SAFETPA—Transaction Auditing Datagraph

Fig.8: SAFETPA—Transactions

Fig.9: SAFETPA—Bluetooth/NFC Environment

Fig.10: SAFETPA—Bluetooth Payment Flowchart

Fig.11: SAFETPA—Bluetooth two-party transfer

Fig.12: SAFETPA—Verified BET transactions

Fig.13: SAFETPA—Meter Readings Flowchart

Fig.14: SAFETPA—Resources flowchart

Fig.15: SAFETPA—Button Micropayments Flowchart

Fig.16: SAFETPA—Personnel/Migration Tracking by BET flowchart

Fig.17: SAFETPA—Voting flowchart

Fig.18 - SAFETPA Transaction Logic Flow

Fig. 19: SAFETPA—Datagraph1

Fig.20: SAFETPA--Datagraph2

Fig. 21: SAFETPA—Datagraph3

| Field | Description | Size |
|---|---|---|
| Magic No | Value always 0xD9B4BEF9 | 4 bytes |
| Blocksize | Number of bytes following up to end of block | 4 bytes |
| Blockheader | Consists of 6 items | 80 bytes |
| Transaction counter | Positive integer VI = Varint | 1-9 bytes |
| transactions | The (non empty) list of transactions | <Transaction counter>-many transactions |

Fig.23

| Field | Purpose | Updated when... | Size |
|---|---|---|---|
| Version | Block version number | When software upgraded | 4 |
| hashPrevBlock | 256-bit hash of the previous block header | A new block comes in | 32 |
| hashMerkleRoot | 256-bit hash based on all of the transactions in the block (aka checksum) | A transaction is accepted | 32 |
| Time | Current timestamp as seconds since 1970-01-01T00:00 UTC | Every few seconds | 4 |
| Bits | Current target in compact format | The difficulty is adjusted | 4 |
| Nonce | 32-bit number (starts at 0) | A hash is tried (increments) | 4 |

Fig.24

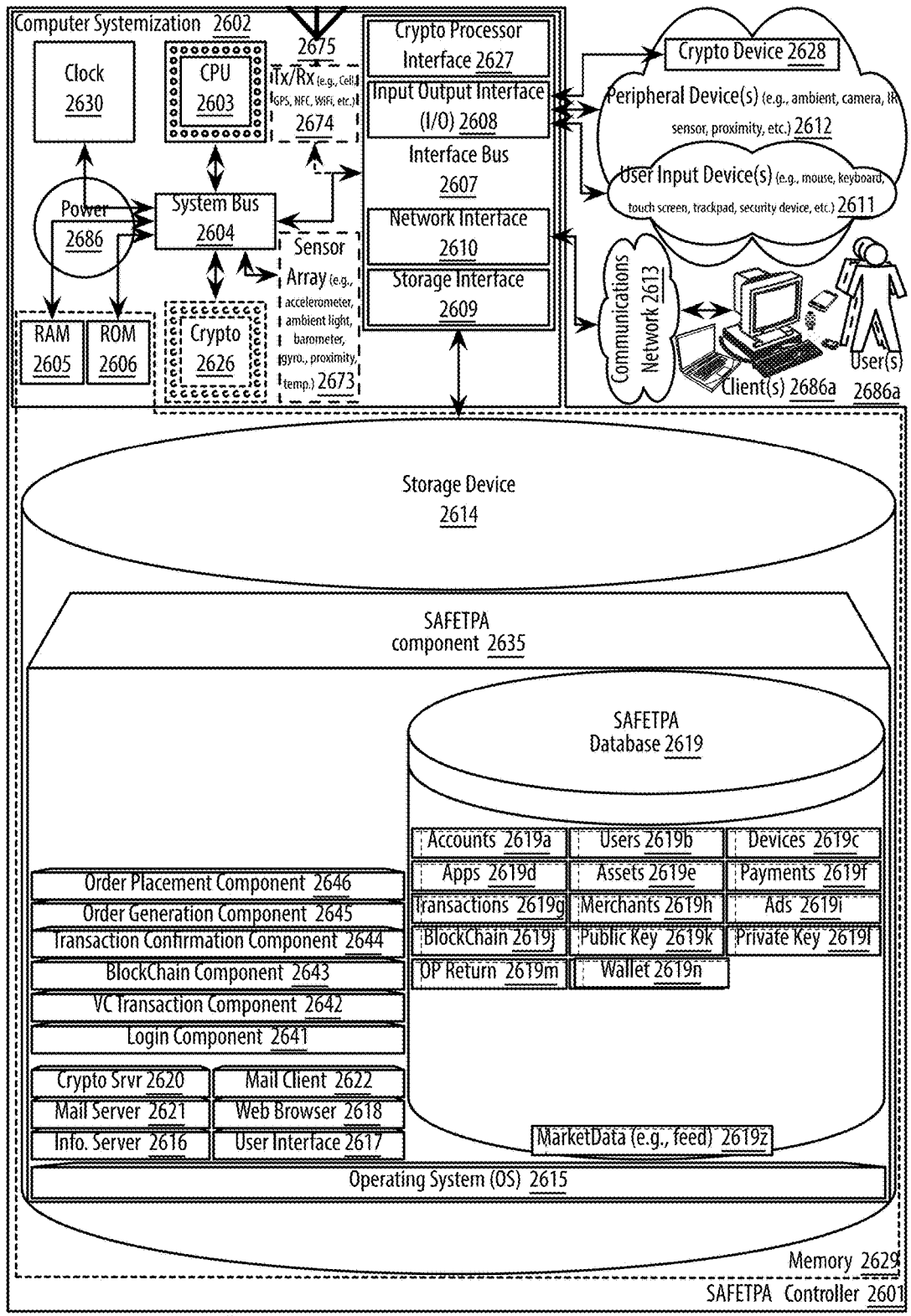
Fig.26: SAFETPA—Controller

US 10,504,179 B1

SOCIAL AGGREGATED FRACTIONAL EQUITY TRANSACTION PARTITIONED ACQUISITION APPARATUSES, METHODS AND SYSTEMS

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address Guided Target Transactions and Fractional Ownership Transaction Processing, and more particularly, include Social Aggregated Fractional Equity Transaction Partitioned Acquisition Apparatuses, Methods and Systems.

As such, the present innovations include (at least) the following distinct areas, including: Electrical Communications with Selective Electrical Authentication of Communications (with a suggested Class/Subclass of 340/5.8); Data Processing Using Cryptography for Secure Transactions including Transaction Verification and Electronic Credentials (with a suggested Class/Subclass of 705/64, 74, 75); and Electronic Funds Transfer with Protection of Transmitted Data by Encryption and Decryption (with a suggested Class/Subclass of 902/2).

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Bitcoin is the first successful implementation of a distributed crypto-currency. Bitcoin is more correctly described as the first decentralized digital currency. It is the largest of its kind in terms of total market value and is built upon the notion that money is any object, or any sort of record, accepted as payment for goods and services and repayment of debts. Bitcoin is designed around the idea of using cryptography to control the creation and transfer of money. Bitcoin enables instant payments to anyone, anywhere in the world. Bitcoin uses peer-to-peer technology to operate with no central authority. Transaction management and money issuance are carried out collectively by the network via consensus.

Bitcoin is an open source software application and a shared protocol. It allows users to anonymously and instantaneously transact Bitcoin, a digital currency, without needing to trust counterparties or separate intermediaries. Bitcoin achieves this trustless anonymous network using public/private key pairs, a popular encryption technique.

Bitcoin, a cryptographically secure decentralized peer-to-peer (P2P) electronic payment system enables transactions involving virtual currency in the form of digital tokens. Such digital tokens, Bitcoin coins (BTCs), are a type of crypto-currency whose implementation relies on cryptography to generate the tokens as well as validate related transactions. Bitcoin solves counterfeiting and double-spending problems without any centralized authority. It replaces trust in a third-party such as a bank with a cryptographic proof using a public digital ledger accessible to all network nodes in which all BTC balances and transactions are announced, agreed upon, and recorded. Transactions are time-stamped by hashing them into an ongoing chain of hash-based proof-of-work (PoW) forming a record that can't be changed without redoing the entire chain. Anonymity is maintained through public-key cryptography by using peer-to-peer (P2P) addresses without revealing user identity.

Bitcoin coin (BTC) is essentially a hashed chain of digital signatures based upon asymmetric or public key cryptography. Each participating Bitcoin address in the P2P network is associated with a matching public key and private key wherein a message signed by private key can be verified by others using the matching public key. A Bitcoin address corresponds to the public key which is a string of 27-34 alphanumeric characters such as: 1BZ9aCZ4hHX7rnnrt2u HTfYAS4hRbph3UN and occupies about 500 bytes. Users are encouraged to create a new address for every transaction to increase privacy for both sender and receiver. While this creates anonymity for both sender and receiver, however, given irreversibility of transactions, nonrepudiation may be compromised. Addresses can be created using Bitcoin clients or 'wallets'. The sender uses his or her private key to assign payments to receiver's public key or address. Characters within the address also serve as checksum to validate any typographical errors in typing the address. The private key is the secret key that is necessary to access BTCs assigned to the corresponding public key address. Private keys start with first character '1' or '3,' where '1' implies use of one key while '3' denotes multiple private keys for 'unlocking' a payment. Bitcoin addresses and associated private keys are stored in encrypted wallet data files typically backed up offline for security. If a wallet or a private key is lost, related BTCs are then also irretrievably lost.

BRIEF DESCRIPTION OF THE DRAWINGS

Appendices and/or drawings illustrating various, non-limiting, example, innovative aspects of the Social Aggregated Fractional Equity Transaction Partitioned Acquisition Apparatuses, Methods and Systems, (hereinafter "SAFETPA") disclosure, include:

FIG. 23 shows a schematic representation of the data structure of an equity ownership transaction block in the blockchain maintained by the SAFETPA;

FIG. 24 shows a schematic representation of the data structure of the blockheader field of the ownership transaction block in the blockchain maintained by the SAFETPA;

FIG. 26 shows a block diagram illustrating embodiments of a SAFETPA controller.

Figure 1:
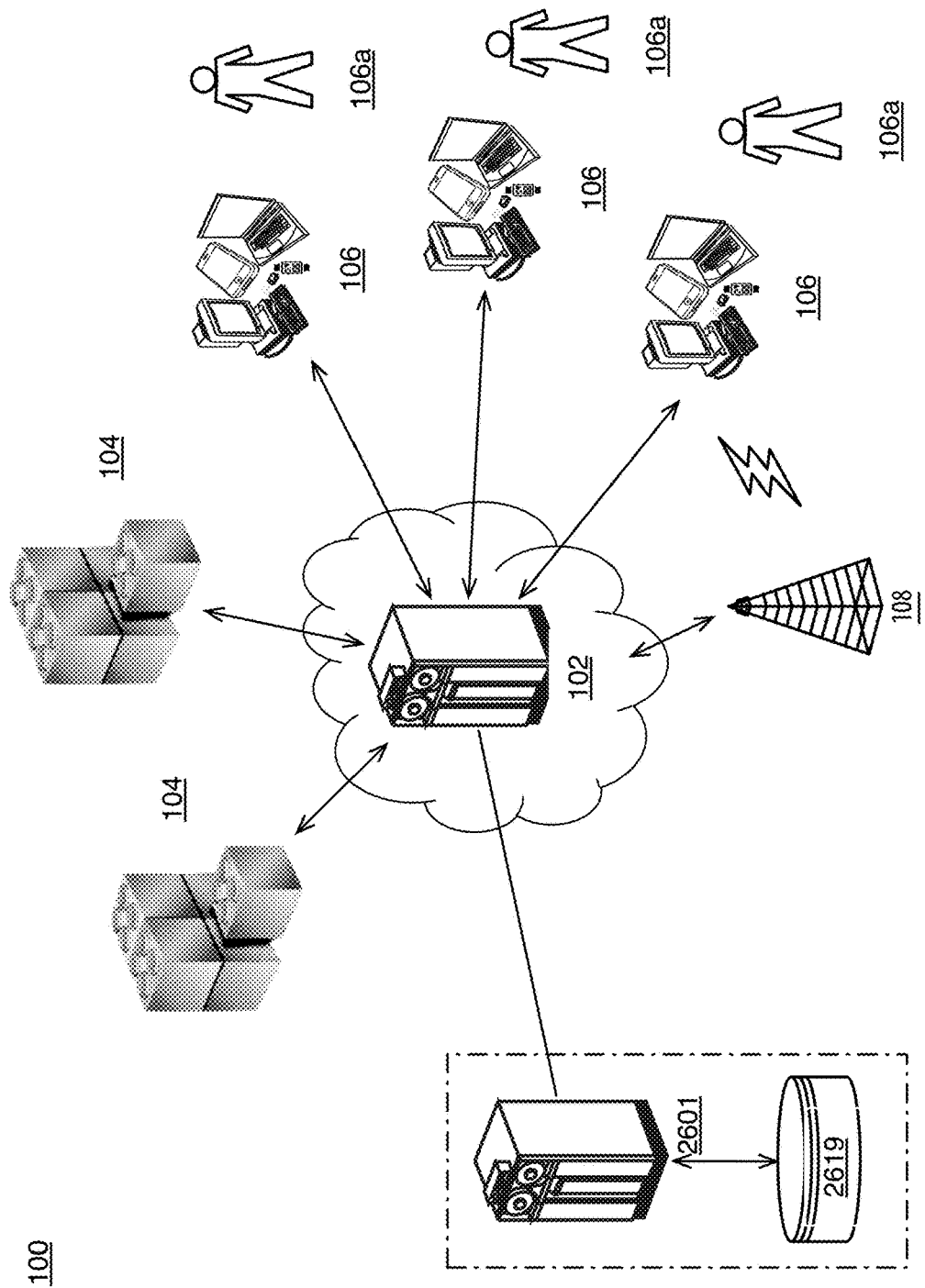
FIG. 1 shows a block diagram illustrating embodiments of a network environment including the SAFETPA.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citation and/or reference numbers are not necessarily sequences but rather just example orders that may be rearranged and other orders are contemplated.

DETAILED DESCRIPTION

The Social Aggregated Fractional Equity Transaction Partitioned Acquisition Apparatuses, Methods and Systems, (hereinafter "SAFETPA") transforms virtual wallet addresses or fractional order purchase request inputs, via SAFETPA components (e.g., Virtual Currency Component, Blockchain Component, Transaction Confirmation Component, etc.), into transaction confirmation outputs. The components, in various embodiments, implement advantageous features as set forth below.

Introduction

Bitcoin transactions are typically posted on a public, distributed ledger called a blockchain. The Bitcoin network stores complete copies of the blockchain on nodes that are distributed around the world. Anyone can install the Bitcoin software on a networked computer to begin running a node. Because the blockchain is public, anyone can see the complete history of Bitcoin transactions and the public addresses that are currently "storing" Bitcoin.

In order to move Bitcoin between public addresses, a user must prove that he owns the sending address that is storing the Bitcoin to be sent, and know the receiving address where the Bitcoin is to be transferred.

Before Bitcoin can be transferred out of a public address, the owner of that address must prove that he owns the address by signing the transaction with the same private key that was used to generate the public address. Upon successfully doing so, the transaction is then broadcast to the Bitcoin network. The network groups transactions into blocks, confirms that the transactions are valid, and adds the block to the blockchain.

Bitcoin as a form of payment for products and services has grown, and merchants have an incentive to accept it because fees are lower than the 2-3% typically imposed by credit card processors. Unlike credit cards, any fees are paid by the purchaser, not the vendor. The European Banking Authority and other authorities have warned that, at present, Bitcoin users are not protected by refund rights or an ability to obtain chargebacks with respect to fraudulent or erroneous transactions. These and other limitations in the previous implementation of Bitcoin are now readily overcome.

Uses

One possible non-monetary implementation for the SAFETPA is as a shared (virtual) ledger used to monitor, track and account for actual people that may go missing. Social media systems could use SAFETPA as a more secure and flexible way to keep track of people, identities and personas.

Using a SAFETPA as a way to store the identities will enable broad access to authorized users and can be implemented in a publicly-available way. Each and every addition or deletion to the ledger of identities will be traceable and viewable within the SAFETPA's Blockchain ledger.

This can be done by defining a few fields, with size and other attributes, publicly sharing the definition and allowing those skilled in the art to access and update, delete, change entries via tracing and auditing.

Implementations such as this could be used, for example with universities or governments and allow greater transparency. For instance, imagine there is a migration of peoples out of one country, say, in response to war or natural disaster. Typically, in historical cases there has been no feasible way to quickly track migrants during their relocation. A non-governmental organization (NGO) could use SAFETPA to create a Blockchain ledger of all displaced persons and that ledger could be used to track them through resettlement. The ledger could be referenced by individuals who could compare their credentials with those that are encrypted and stored through the ledger at a specific time and date in a Bitcoin-like format.

The SAFETPA system could also be used for voting in places where there may not be well developed voting tabulation systems and where voting tallies are suspect. For example, it can be used to build a voting system in a developing country. By using the blockchain technology, an immutable ledger is created that records the votes of each citizen. The record would allow for unique identification of each voting individual and allow for tabulation of votes. One could easily tell if people actually voted, for whom they voted, and confirms that no one voted twice. A virtual fingerprinting or other biometrics could be added to the ledger to help avoid fraud, as described herein in more detail with respect to additional embodiments.

SAFETPA may also be used for Proxy Voting for stocks or Corporations Annual Meetings that have questions put to a vote or for directors. The Blockchain adds transparency, speed and access to the information—and it can be verified and interrogated by many people. Accordingly, no one source needs to be trusted, as anyone in the public can see the ledger.

In underdeveloped areas the transport method could easily be 3G†LTE†4G†Mesh Networks with TCP†P or other protocols used to transport the messages from a remote area, serviced by Mobile phone service—to the cloud where the accessible, shared Blockchain ledgers are maintained and made publicly available.

Implementations for better tracking of usage of resources can be enabled through the SAFETPA. For example, water meters, electric & gas meters, as well as environmental monitoring devices such as C02 emitter meters can be used to inform enable a Bitcoin-style transaction involving resource usage or pollution emission. Using measurement devices that track the usage of these household resources or industrial pollutants, a Bitcoin-enabled marketplace between individuals, corporations and government entities can be created.

Suppose Alex lives a community or state that taxes greenhouse gases. By using the SAFETPA, both government waste as well as friction in the financial system can be mitigated. Alex may instantly receive a credit or a surcharge based on his use of resources. Micro transactions, which are not practical today because of the relatively high transaction costs, are easily accommodated as SAFETPA-enabled transactions, on the other hand, and can be moved daily, hourly or weekly with little transaction overhead.

For example, Alex makes a payment via SAFETPA that can be placed on the block chain for the tax amount due, but which may not be valid until a certain date (e.g. end of the month). When the transaction becomes valid, Bitcoin-like virtual currency is transferred to the town treasury and the town immediately credits some amount back, based on the meter reading.

Alex may have a $500 carbon surcharge on his taxes today. The monitors on Alex's furnace, his gas meter and electric meter can sum up all his uses resulting in carbon emissions and then net them out—all using the blockchain. Then because the blockchain is accessible by his local town he can get the surcharged reduced by, for example, $250 per year in response to Alex's environmentally-friendly actions. Whereas in previous systems, Alex would have had to write out a check and mail it in, now, with SAFETPA, a simple entry in the blockchain is created, read by the town hall and a corresponding entry is made in the town hall ledger. By moving virtual currency between the two ledgers (could be the same ledger but different accounts) we have "monies" moved without the mailing of a check, without the meter reader coming by, and without the bank processing as in prior systems.

Much like in home uses of SAFETPA, the SAFETPA may create a new paradigm for costs and billings of hotels, residences, dormitories, or other housings and lodgings having resources that are metered and billed to its occupants. The Blockchain may be used to track usage of resources such as water, electricity, TV charges, movie rentals, items taken from the refrigerator or mini-bar, heat and room temperature controls and the like. Hotel customers, resident, students or the like residing in individual or mass housing or lodging may then be credited or surcharged for their stay based on Bitcoin-enabled transactions and monitoring of their use of resources.

Monitors can be setup on appliances, heaters, a room by room water meter, and the like. The monitors can communicate with each other via Bluetooth, NFC, Wifi or other known means. Since low power consumption is generally preferred, the monitors may be coordinated by a single device in the room.

Through a hotel's use of SAFETPA, a client may check in, get a room assignment and receive a virtual key to enter the assigned room. The virtual key may be sent to the client's SAFETPA ledger, stored on his smartphone or other portable electronic device, and may be used to open the door when the phone is placed in proximity to the hotel room door lock, for example, where the smartphone or other device is Bluetooth or NFC-enabled and is in communication range of a corresponding reader in the room. This reader then connects with each measuring device for TV, heat, room service, water usage, etc. Throughout the client's stay, it tracks when the lights or air conditioning are left on, when in-room movies are rented, water usage for bath, sink and toilet and other chargeable room uses. A hotel client's bill upon check out can be reduced or enhanced with the hotel client's usage. Blockchain technology may also be used to record check-in and check-out times in order to more quickly free up the room to be rented again.

Also, SAFETPA may be used to enable a seamless checkout process. When a client checks in, a smart contract is created to move Bitcoin-like virtual currency after his checkout date. Since the address that the client provides at the time of check-out might not contain enough funds as it did on check-in, the projected funds for this transaction may remain locked by the SAFETPA, which can become valid and transferrable at a later time, ie. upon check-out date. The hotel will immediately send credits or debits based on the actual usage of the hotel's amenities.

A consumer-focused creation for SAFETPA could be using a Bluetooth Beacon as a method for determining where to send a payment from a virtual currency wallet. The housekeeper could tag a hotel room with her Bluetooth beacon. A client staying in the room could use their mobile device to pick up that Beacon, receive a virtual id of the housekeeper, and transfer an amount to the virtual id as a tip. In the same manner, the SAFETPA system could be used for the valet who retrieves the client's car, as well as other service providers at the hotel that may receive gratuities or the like.

Clients could also pay for Pay Per View Movies by Bluetooth/NFC sync and pay using their SAFETPA wallet.

Currently the Bluetooth Beacon is of a size that does not physically allow all uses, but over time it will shrink in size and allow uses on many devices and many purposes. Paying the housekeeper, the dog walker, the valet, and possibly tipping your waitress. The blockchain technology provides many ways to pay someone without having to even talk to them and without the exchange of cash or credit card number, thus reducing the potential for fraud that commonly results from such transactions presently.

Another implementation of SAFETPA is transactions involving a high value. For example, two persons which to make a face-to face transaction may meet in proximity of a Bluetooth beacon, where the Bluetooth or NFC chips in their respective electronic devices are matched. SAFETPA can enable the transaction of a large sum of money and micro-payments from the SAFETPA address of a payer to the SAFETPA address of the payee via the Bluetooth beacon or NFC reader, while avoiding the transaction fees that may render such transactions traditionally infeasible.

Using alternative, electronic currencies supported by Blockchain technology, individuals can carry all the funds needed in a currency that is not susceptible to local changes—allowing the seller to get paid and transfer his monies back into dollars or another currency.

Another example is using a pre-built device that is used to order small amounts of relatively inexpensive items in a fast and convenient way. SAFETPA could make these micro transactions feasible. For instance, a product or its packaging could include a button connected via Bluetooth or WiFi, Radio Frequencies or NFC (see, e.g., AMAZON DASH). This button could be re-usable and disposable. Once pushed the button will result in an order to a vendor or fulfillment house for a replacement of the individual product. On the back end, the shipping of the items could be aggregated through new or existing systems.

However, on the payment processing side there is an overhead percentage that must be paid to credit- or debit-payment processing facilities that facilitate a traditional currency-based transaction. When payment is made with virtual currency via SAFETPA in place of traditional currency transaction, the actual transaction cost is much lower.

Unlike prior Bitcoin implementations, the SAFETPA also provides a centralized source for transaction processing, clearance and auditing. AS such the operator of the SAFETPA, for example, may collect transaction fees associated with use of the SAFETPA network. The operator may also be a guarantor of the accuracy of the transactions, and may reimburse a user in case of fraud or erroneous processing.

SAFETPA

FIG. 1 shows a block diagram illustrating networked embodiments of the SAFETPA.

The network environment 100 may include a SAFETPA Server 1801, the functions and components of which described in detail below with respect to FIG. 18. The SAFETPA Server 1801 may comprise one or many servers, which may collectively be included in the SAFETPA System.

The network environment 100 may further include a SAFETPA Database 1819, which may be provided to store various information used by the SAFETPA Server 1801 including client portfolio data, financial transaction data, and any other data as described, contemplated and used herein.

The network environment 100 may further include a Network Interface Server 102, which, for example, enables data network communication between the SAFETPA Server 1801, Third Party Server(s) 104, wireless beacon 108 and Client Terminal(s) 106, in accordance with the interactions as described herein.

The one or more Client Terminals 106 may be any type of computing device that may be used by Clients 106*a* to connect with the SAFETPA Server 1801 over a data communications network. Clients 106*a*, in turn, may be customers who hold financial accounts with financial or investing institutions, as described further herein.

The Third Party Server(s) 104 may be operated by any other party that is involved in a transaction. Accordingly, the third party server 104 may be any type of computing device described herein as may be operated by a vendor, a payment processor, an individual, a corporation, a government agency, a financial institution, and the like.

The wireless beacon 108 may be any type of wireless transceiver for relaying information between client devices 106 for sending or receiving payment information within a localized geographic area. Accordingly, the wireless beacon 108 may be Bluetooth, Near Field Communication (NFC), WiFi (such as IEEE 802.11) wireless routers, and the like.

The servers and terminals represented in FIG. 1 cooperate via network communications hardware and software to initiate the collection of data for use in the SAFETPA system, the processes involving which will now be described in more detail.

Figure 2:
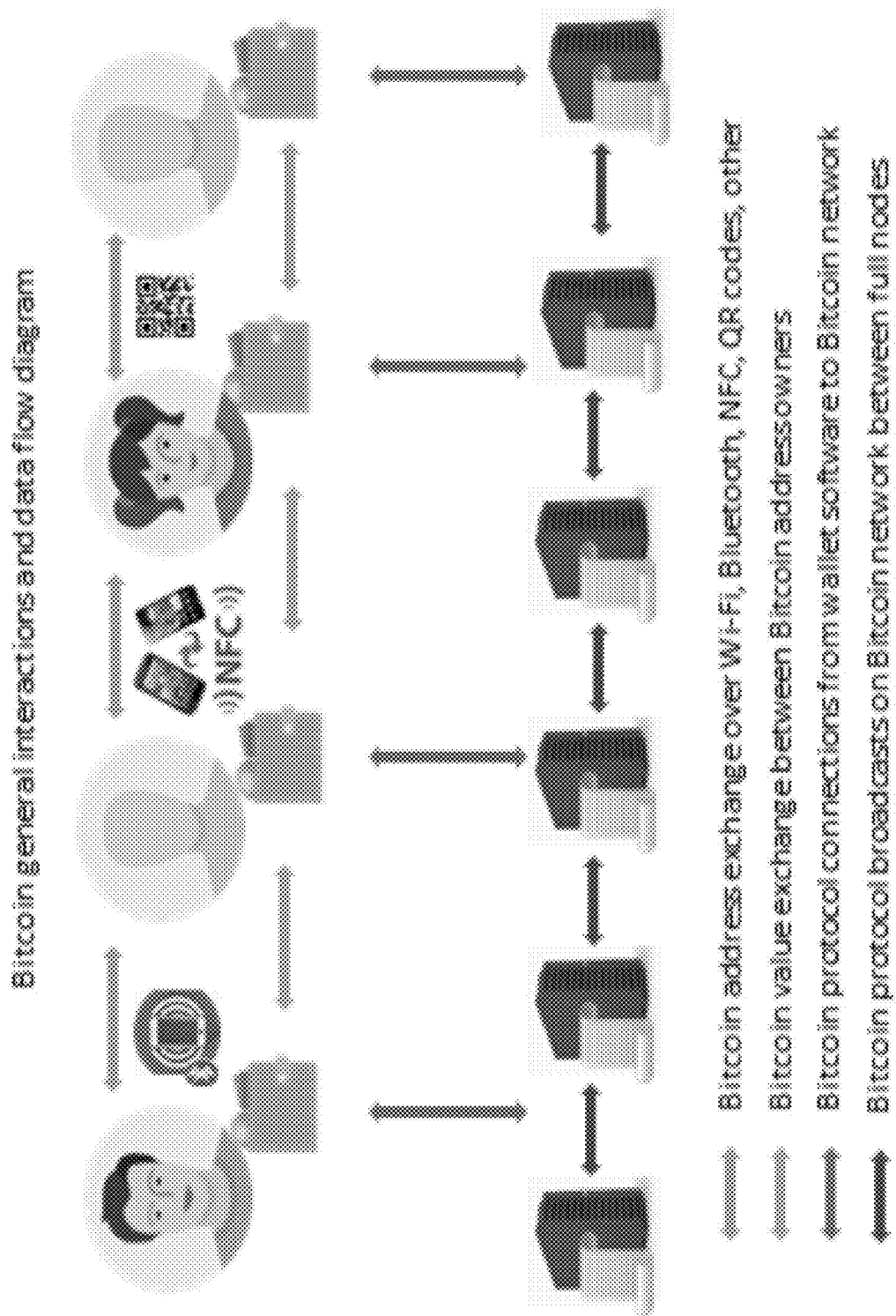
FIG. 2 shows a block diagram illustrating embodiments of a network environment including the SAFETPA.

FIG. 2 shows a second block diagram illustrating embodiments of a network environment including the SAFETPA. This includes the interactions between various parties using the SAFETPA system.

Figure 3:
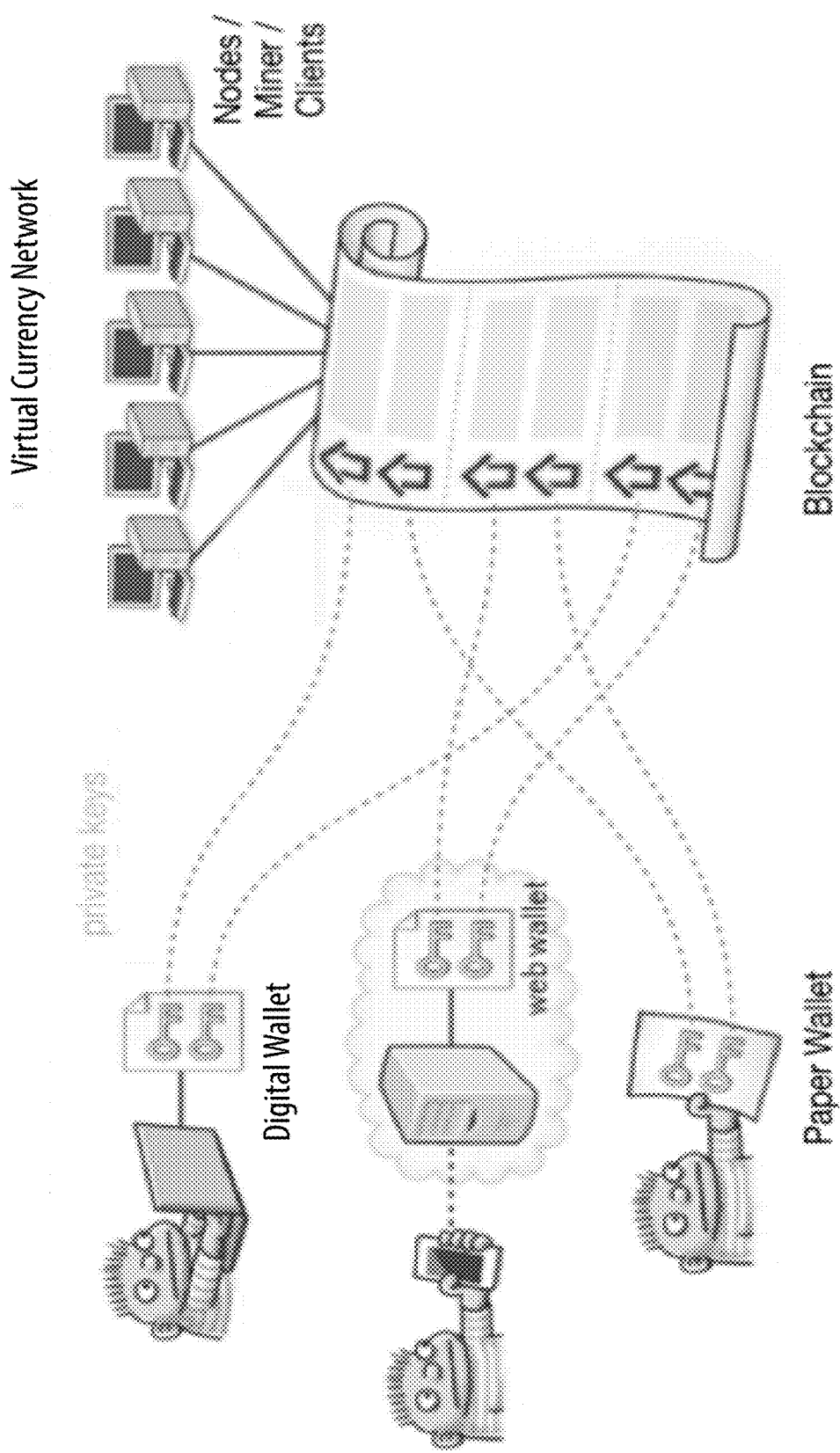
FIG. 3 shows a block diagram illustrating embodiments of a network nodes of the SAFETPA

FIG. 3 shows a block diagram illustrating embodiments of network nodes of the SAFETPA, in which virtual currency wallet transactions are recorded in Bitcoin-style blockchains.

Virtual currency users manage their virtual currency addresses by using either a digital or paper "wallet." Wallets let users send or receive virtual currency payments, calculate the total balance of addresses in use, and generate new addresses as needed. Wallets may include precautions to keep the private keys secret, for example by encrypting the wallet data with a password or by requiring two-factor authenticated logins.

Virtual wallets provide the following functionality: Storage of virtual currency addresses and corresponding public/private keys on user's computer in a wallet.dat file; conducting transactions of obtaining and transferring virtual currency, also without connection to the Internet; and provide information about the virtual balances in all available addresses, prior transactions, spare keys. Virtual wallets are implemented as stand-alone software applications, web applications, and even printed documents or memorized passphrases.

Virtual wallets that directly connect to the peer-to-peer virtual currency network include bitcoind and Bitcoin-Qt, the bitcoind GUI counterparts available for Linux, Windows, and Mac OS X. Other less resource intensive virtual wallets have been developed, including mobile apps for iOS and Android devices that display and scan QR codes to simplify transactions between buyers and sellers. Theoretically, the services typically provided by an application on a general purpose computer could be built into a stand-alone hardware device, and several projects aim to bring such a device to market.

Virtual wallets provide addresses associated with an online account to hold virtual currency funds on the user's behalf, similar to traditional bank accounts that hold real currency. Other sites function primarily as real-time markets, facilitating the sale and purchase of virtual currency with established real currencies, such as US dollars or Euros. Users of this kind of wallet are not obliged to download all blocks of the block chain, and can manage one wallet with any device, regardless of location. Some wallets offer additional services. Wallet privacy is provided by the website operator. This "online" option is often preferred for the first acquaintance with a virtual currency system and short-term storage of small virtual currency amounts and denominations.

Any valid virtual currency address keys may be printed on paper, i.e., as paper wallets, and used to store virtual currency offline. Compared with "hot wallets"-those that are connected to the Internet—these non-digital offline paper wallets are considered a "cold storage" mechanism better suited for safekeeping virtual currency. It is safe to use only if one has possession of the printed the paper itself. Every such paper wallet obtained from a second party as a present, gift, or payment should be immediately transferred to a safer wallet because the private key could have been copied and preserved by a grantor.

Various vendors offer tangible banknotes, coins, cards, and other physical objects denominated in bitcoins. In such cases, a Bitcoin balance is bound to the private key printed on the banknote or embedded within the coin. Some of these instruments employ a tamper-evident seal that hides the private key. It is generally an insecure "cold storage" because one can't be sure that the producer of a banknote or a coin had destroyed the private key after the end of a printing process and doesn't preserve it. A tamper-evident seal in this case doesn't provide the needed level of security because the private key could be copied before the seal was applied on a coin. Some vendors will allow the user to verify the balance of a physical coin on their website, but that requires trusting that the vendor did not store the private key, which would allow them to transfer the same balance again at a future date before the holder of the physical coin.

To ensure safety of a virtual wallet in the SAFETPA system, on the other hand, the following measures are implemented: wallet backup with printing or storing on flash drive in text editor without connection to Internet; encryption of the wallet with the installation of a strong password; and prudence when choosing a quality service.

Figure 4:
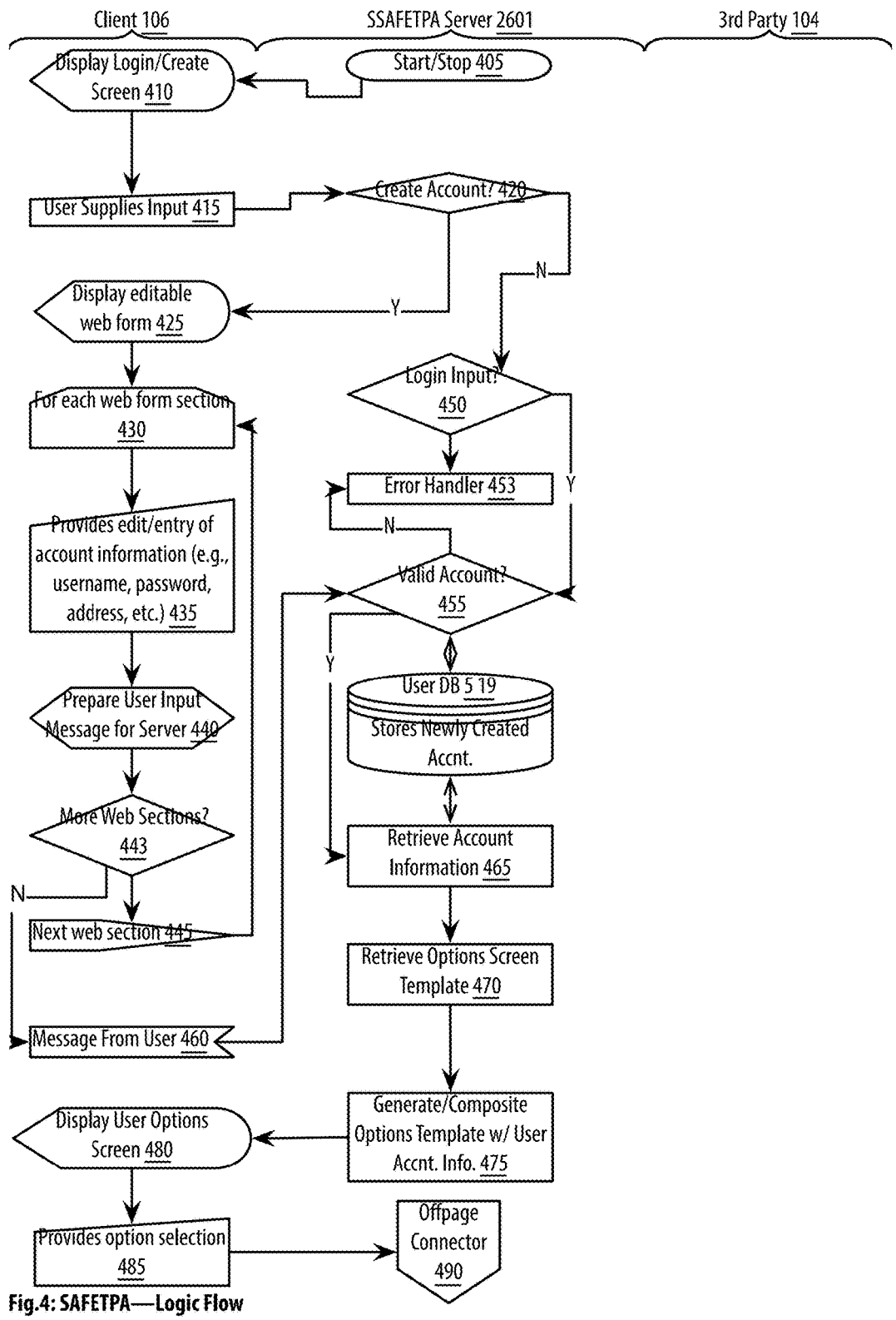
FIG. 4 shows a datagraph diagram illustrating embodiments of a login process for the SAFETPA.

FIG. 4 shows a datagraph diagram illustrating embodiments of a login process for the SAFETPA. Commencing at step 405, the SAFETPA Controller 1801 responds to a user's (i.e., a recruiter's or candidate's) login request and displays a login/create account screen on the Client Terminal 106 (step 410). The user responsively enters an input (step 415) comprising either a login request to an existing account, or a request to create a new account. At step 420, if the user is requesting to create an account, the process continues to step 425 below. If instead, the user is requesting access to an existing account, the process continues to step 435 below.

When the user's entry comprises a request to create a new account, the SAFETPA Controller 1801 prepares and transmits a web form and fields for creating a new account (step 425).

Next, at step 430, the user enters any requisite information in the displayed web form fields. Such web form may include fields for entering the user's full name, address, contact information, a chosen username, a chosen password and/or any other useful identification information to associate with the account (step 435). The user's inputs are then prepared for transmission to the SAFETPA Controller 1801 (step 436). The Client Terminal 106 confirms whether there are more web sections or forms to complete (step 440). If so, the process returns to step 430 above. Otherwise, the process continues to step 460, where the entered account information is transmitted to the SAFETPA Controller 1801 for storage in, for example, the maintained Account Database 1819a, as described in more detail later below.

From either step 420 or 460 above, the process continues to step 435, wherein the SAFETPA Controller 1801 determines whether a login input has been received. If so, the process continues to step 455 below. Otherwise, the process continues to an error handling routine (step 441), wherein the user may be given a limited number of attempts to enter a login input that corresponds to a valid stored investment account. If no valid login is presented within the given number of allowed attempts, the user is denied access to the SAFETPA Controller 1801.

At step 453, the SAFETPA Controller 1801 determines whether a valid login input has been received, for example by comparing the received login input to data stored in the SAFETPA Database 1819. If the received login credentials are valid, the process continues to step 465 below. Otherwise the process returns to step 441 above.

At step 465, when valid login credentials have been received from the Client Terminal 106, the SAFETPA Controller 1801 retrieves account information appropriate for the user. Next, at step 470, the SAFETPA Controller 1801 retrieves an options screen template based on the user, and then generates a composite options screen with the user's account information (step 475), which is transmitted to the client terminal 106 for display to a user on a display device thereof (step 480).

Figure 5:
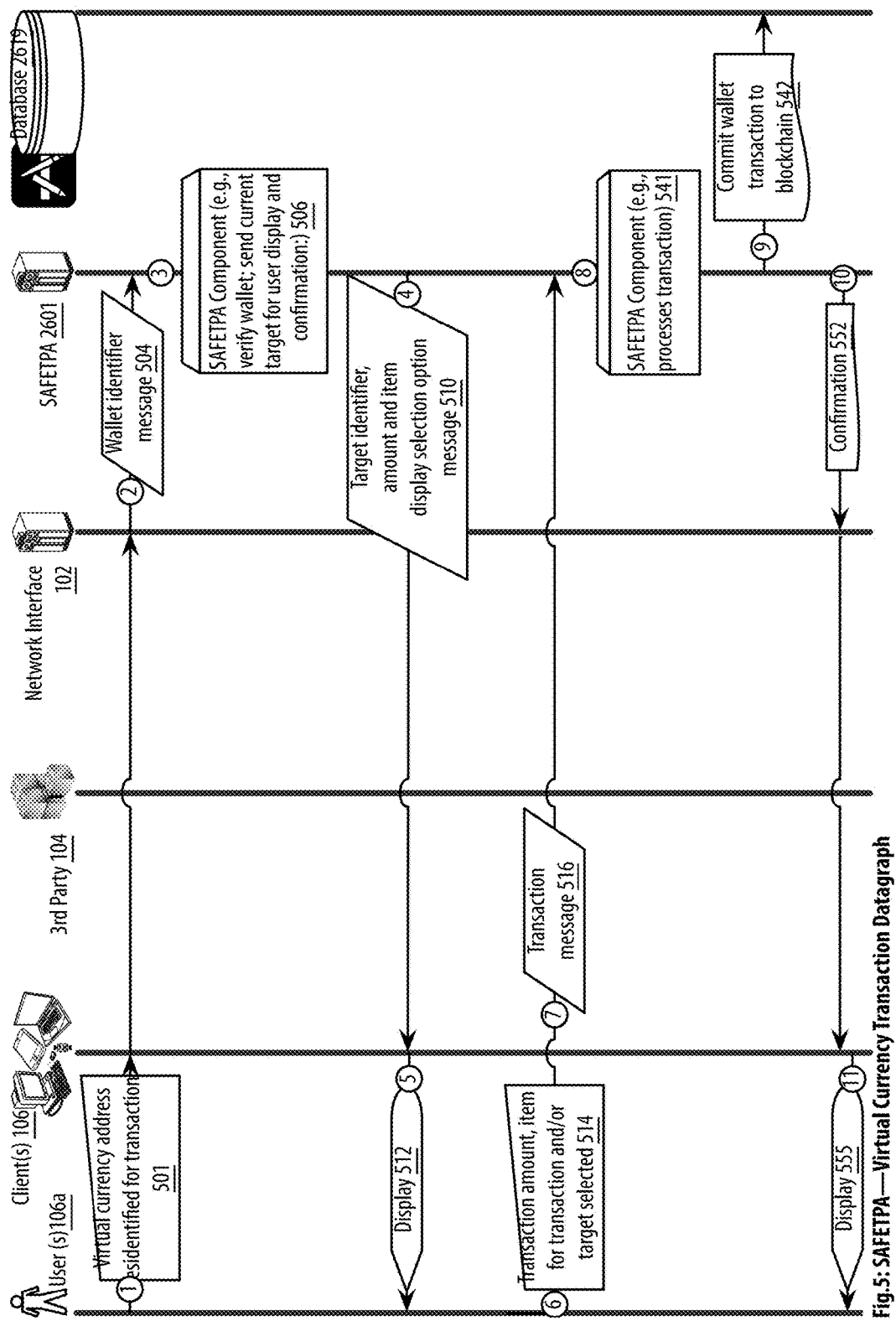
FIG. 5 shows a datagraph illustrating embodiments of an event trace for a typical transaction for the SAFETPA.

FIG. 5 shows a datagraph illustrating embodiments of a virtual currency transaction performed by the SAFETPA. A user 106a may engage their client 106 such that their virtual wallet interacts with the SAFETPA to affect a transfer of virtual currency to a third party. The third party may confirm the transaction via third-party device 104. In one example, the network interface 102 includes a beacon that may be attached to another device (e.g., a utility monitoring device, a consumable item, another mobile client device, a smartphone, computer, etc.). The beacon may provide a destination virtual currency address to which a transfer of virtual currency is to be completed. Alternatively, or in addition thereto, the third party device 104 may provide the destination address for a transaction in place of a beacon, according to the various implementations described herein. Likewise, the client may provide the destination address with the transaction request when it is otherwise known to the client 106. The network device 102 may be configured to enable network communication between at least one P2PTAG server 1801 and the client terminal 106 and/or third party device 104.

To commence a transaction, the client terminal 106 forwards a wallet identifier message (step 504) to the server 1801. In one embodiment, the SAFETPA server may have instantiated a SAFETPA component 1841, which in turn may verify that the wallet identifier is valid. In one embodiment, the SAFETPA component will determine that the client's 106 unique identifying address matches and is a valid source of sufficient virtual currency and is properly associated with the wallet identifier (e.g., by checking with a blockchain database 1819j, a wallet database 1819n, and/or the like)(step 506). If the wallet identifier is a non-invalid identifier, the SAFETPA may generate a user interface prompt to allow a user to specify a target for payment proceeds, a selection mechanism for the target (e.g., a person, organization, cause, etc.), an amount to pay (e.g., in various electronic and/or real currencies), an item specification for the transaction (e.g., goods, services, equities, derivatives, etc.). In one embodiment, the SAFETPA will search a database to determine what target wallets are currently associated with the network device 104. For example, in one embodiment, a hotel cleaning employee may have registered a room, or a valet may have registered with a valet parking beacon, etc., and their digital wallet will be retrieved and an address therefrom specified as a target for a transaction. Upon generating the interface (e.g., by retrieving an HTML template from the SAFETPA database and compositing retrieved information, etc.), the SAFETPA server 1801 may provide the user's client 106 with an interaction interface message (step 510) (e.g., allowing the user to see the target payment/transaction identifier (e.g., hotel valet, and/or hotel organization name, etc.), specify and amount to pay (e.g., a tip amount), an item for transaction (e.g., a towel), and a mechanism to instantiate the transaction (e.g., a 'pay' button) for display (step 512). Upon obtaining inputs for these UI selection mechanisms (step 514), the network device 102 may further on the user's transaction message with selections (step 516) to the SAFETPA server 1801 for transaction processing by the SAFETPA component (step 541).

In one embodiment, the client may provide the following example guidance transaction request, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version="1.0" encoding="UTF-8"?>
<guidanceTransactionRequest>
<timestamp>2020-12-31 23:59:59</timestamp>
<user_accounts_details>
    <user_account_credentials>
        <user_name>JohnDaDoeDoeDoooe@gmail.
            com</account_name>
        <password>abc123</password>
        //OPTIONAL <cookie>cookieID</cookie>
        //OPTIONAL <digital_cert_link>www.mydigital
            certificate.com/JohnDoeDaDoeDoe@gmail.com/
            mycertifcate.dc</digital_cert_link>
        //OPTIONAL <digital_certificate>_DATA_</digi-
            tal_certificate>
    </user_account_credentials>
</user_accounts_details>
<client_details>//iOS Client with App and Webkit
    //it should be noted that although several client details
    //sections are provided to show example variants of
        client
    //sources, further messages will include only on to save
    //space
    <client_IP>10.0.0.123</client_IP>
    <user_agent_string>Mozilla/5.0 (iPhone; CPU iPhone
        OS 7_1_1 like Mac OS X) AppleWebKit/537.51.2
        (KHTNL, like Gecko) Version/7. Mobile/11D201
        Safari/9537.53</user_agent_string>
    <client_product_type>iPhone6,1</client_product_
        type>
    <client_serial_number>DNXXX1X1XXXX</client_
        serial_number>
    <client_UDID>3XXXXXXXXXXXXXXXXXXX
        XXXD</client_UDID>
    <client_OS>iOS</client_OS>
    <client_OS_version>7.1.1</client_OS_version>
    <client_app_type>app with webkit</client_app_type>
    <app_installed_flag>true</app_installed_flag>
    <app_name>SAFETPA.app</app_name>
    <app_version>1.0</app_version>
    <app_webkit_name>Mobile    Safari</client_webkit_
        name>
    <client_version>537.51.2</client_version>
</client_details>
<client_details>//iOS Client with Webbrowser
    <client_IP>10.0.0.123</client_IP>
    <user_agent_string>Mozilla/5.0 (iPhone; CPU iPhone
        OS 7_1_1 like Mac OS X) AppleWebKit/537.51.2
        (KHTML, like Gecko) Version/7.8 Mobile/11D201
        Safari/9537.53</user_agent_string>
    <client_product_type>iPhone6,1</client_product_
        type>
    <client_serial_number>DNXXX1X1XXXX</client_
        serial_number>
    <client_UDID>3XXXXXXXXXXXXXXXXXXX
        XXD</client_UDID>
    <client_OS>iOS</client_OS>
    <client_OS_version>7.1.1</client_OS_version>
    <client_app_type>web browser</client_app_type>
    <client_name>Mobile Safari</client_name>
    <client_version>9537.53</client_version>
</client_details>
<client_details>//Android Client with Webbrowser
    <client_IP>10.0.8.123</client_IP>
    <user_agent_string>Mozilla/5.0 (Linux; U; Android
        4.0.4; en-us; Nexus S Build/IMN76D) AppleWeb-
        Kit/534.38 (KHTML, like Gecko) Version/4.0
        Mobile Safari/534.3</user_agent_string>
    <client_product_type>Nexus S</client_product_type>
    <client_serial_number>YXXXXXXXXZ</client_se-
        rial_number>
    <client_UDID>FXXXXXXXXX-XXXX-XXXX-
        XXXXX-X (X</client_UDID>
    <client_OS>Android</client_OS>
    <client_OS_version>4.0.4</client_OS_version>
    <client_app_type>web browser</client_app_type>
    <client_name>Mobile Safari</client_name>
    <client_version>534.30</client_version>
</client_details>
<client_details>//Mac Desktop with Webbrowser
    <client_IP>10.0.8.123</client_IP>
    <user_agent_string>Mozilla/5.0 (Macintosh; Intel Mac
        OS X 18_9_3) AppleWebKit/537.75.14 (KHTML,
        like Gecko) Version/7.0.3 Safari/537.75.14</user_
        agent_string>
    <client_product_type>MacPro5,1</client_product_
        type>
    <client_serial_number>YXXXXXXXXZ</client_se-
        rial_number>
    <client_UDID>FXXXXXXXXX-XXXX-XXXX-XX-
        XXXX-X</client_UDID>
    <client_OS>Mac OS X</client_OS>
    <client_OS_version>10.9.3</client_OS_version>
    <client_app_type>web browser</client_app_type>
    <client_name>Mobile Safari</client_name>
    <client_version>537.75.14</client_version>
</client_details>
<walletID>abc123456789</walletID>
<walletType>source</walletType>
<currencyType>Bitcoin</currencyType>
<targetWalletID>xyz98876543</targetWalletID>
<targetWalletConfirmed>TRUE</targetWalletCon-
    firmed>
<targetWalletIdentifierDisplayed>John Doe, Hotel Inc.
    Valet</targetWalletIdentifierDisplayed>
<transactionDescription1>Tip</transactionDescription1>
<transactionDescription2>
    <item>Air Freshner</item>
    <itemManufacturer>Acme Freshner Inc.</itemManu-
        facturer>
    <itemSerialNo>123456</itemSerialNo>
    <itemModelNo>abc123</itemModelNo>
    <itemPrice>$2.57</itemPrice>
    <currencyValue>6.61</currencyValue>//eg current bit-
        coin value
</transactionDescription2>
</guidanceTransactionRequest>
```

In one embodiment, the SAFETPA component 541 may then provide a commit transaction as between the target wallet identifier (e.g., the hotel valet) and the source wallet identifier (e.g., the initiating user 106) and eventually cause a blockchain entry of the transaction to be recorded (step 542). Thereafter, the SAFETPA server 1801 may provide a confirmation message (step 552) to the client 106 for display (step 555).

An electronic coin may be a chain of digital signatures. Each owner transfers the coin to the next by digitally signing a hash of the previous transaction and the public key of the next owner and adding these to the end of the coin. A payee can verify the signatures to verify the chain of ownership. So, effectively if BTC0 is the previous transaction, the new transaction is:

Kp(Owner1)
hash:=H(BTC0,Kp(Owner1))
S(hash,Ks(Owner0)), where
Kp(Owner1) is the public key fo the recipient (Owner1)
hash:=H(BTC0,Kp(Owner1)) is the hash of the previous transaction together with the public key of the recipient; and
S(hash,Ks(Owner0)) is the previously computed hash, signed with the private key sender (Owner0).
Principle example of a Bitcoin transaction with 1 input and 1 output only
Input:
Previous tx: f5d8ee39a438981c91a5917b9f2dc19d6d1a8e9cea285be69ca73dd4470b9a6
Index: 8
scriptSig: 384582286e21798a42faeee854281abd38bacd1aeed3ee3738d9e1446618c4571d1l98db0221eee2ac988643b8b82ce88ffdfec6b64e3e6ba35e7ba5fdd7d5d6cc8d25c6b241581
Output:
Value: 5888888888
scriptPubKey: OP_DUP OP_HASH160484371785fa9bd789a2fcd52d2c588b65d35549d OP_EQUALVERIFY OP_CHECKSIG The input in this transaction imports 50 denominations of virtual currency from output #0 for transaction number the transaction number starting with character f5d8 . . . above. Then the output sends 50 denominations of virtual currency to a specified target address (expressed here in hexadecimal string starting with 4043 . . . ). When the recipient wants to spend this money, he will reference output #0 of this transaction as an input of his next transaction.

An input is a reference to an output from a previous transaction. Multiple inputs are often listed in a transaction. All of the new transaction's input values (that is, the total coin value of the previous outputs referenced by the new transaction's inputs) are added up, and the total (less any transaction fee) is completely used by the outputs of the new transaction. According to blockchain technology, a transaction is a hash of previous valid transaction strings. Index is the specific output in the referenced transaction. ScriptSig is the first half of a script (discussed in more detail later).

The script contains two components, a signature and a public key. The public key must match the hash given in the script of the redeemed output. The public key is used to verify the redeemer's or payee's signature, which is the second component. More precisely, the second component may be an ECDSA signature over a hash of a simplified version of the transaction. It, combined with the public key, proves the transaction created by the real owner of the address in question. Various flags define how the transaction is simplified and can be used to create different types of payment.

Two consecutive SHA-256 hashes are used for transaction verification. RIPEMD-160 is used after a SHA-256 hash for virtual currency digital signatures or "addresses." A virtual currency address is the hash of an ECDSA public-key, which may be computed as follows:

Key hash=Version concatenated with RIPEMD-168 (SHA-256 (public key))
Checksum=1st 4 bytes of SHA-256 (SHA-256 (Key hash))
Bitcoin address=Base58Encode (Key hash concatenated with Checksum)

The virtual currency address within a wallet may include an identifier (account number), for example, starting with 1 or 3 and containing 27-34 alphanumeric Latin characters (except, typically: 0, O, I, and 1 to avoid possible confusion). The address can be also represented as the QR-code and is anonymous and does not contain information about the owner. It can be obtained for free, using SAFETPA.

The ability to transact virtual currency without the assistance of a central registry is facilitated in part by the availability of a virtually unlimited supply of unique addresses, which can be generated and disposed of at will. The balance of funds at a particular address can be ascertained by looking up the transactions to and from that address in the block chain. All valid transfers of virtual currency from an address are digitally signed using the private keys associated with it.

A private key in the context of virtual currency is a secret number that allows denominations of the virtual currency to be spent. Every address within a wallet has a matching private key, which is usually saved in the wallet file of the person who owns the balance, but may also be stored using other means and methods. The private key is mathematically related to the address, and is designed so that the address can be calculated from the private key while, importantly, the reverse cannot be done.

An output contains instructions for sending virtual currency. ScriptPubKey is the second half of a script. There can be more than one output that shares the combined value of the inputs. Because each output from one transaction can only ever be referenced once by an input of a subsequent transaction, the entire combined input value needs to be sent in an output to prevent its loss. If the input is worth 50 coins but one only wants to send 25 coins, SAFETPA will create two outputs worth 25 coins, sending one to the destination and one back to the source. Any input not redeemed in an output is considered a transaction fee, and whoever operates the SAFETPA will get the transaction fee, if any.

To verify that inputs are authorized to collect the values of referenced outputs, SAFETPA uses a custom scripting system. The input's scriptSig and the referenced output's scriptPubKey are evaluated in that order, with scriptPubKey using the values left on the stack by scriptSig. The input is authorized if scriptPubKey returns true. Through the scripting system, the sender can create very complex conditions that people have to meet in order to claim the output's value. For example, it's possible to create an output that can be claimed by anyone without any authorization. It's also possible to require that an input be signed by ten different keys, or be redeemable with a password instead of a key.

SAFETPA transactions create two different scriptSig/scriptPubKey pairs. It is possible to design more complex types of transactions, and link them together into cryptographically enforced agreements. These are known as Contracts.

An exemplary Pay-to-PubkeyHash is as follows:
scriptPubKey: OP_DUP OP_HASH160 <pubKeyHash>OP_EQUALVERIFY OP_CHECKSIG
scriptSig: <sig><pubKey>

An address is only a hash, so the sender can't provide a full public key in scriptPubKey. When redeeming coins that have been sent to an address, the recipient provides both the signature and the public key. The script verifies that the provided public key does hash to the hash in scriptPubKey, and then it also checks the signature against the public key.

Figure 6:
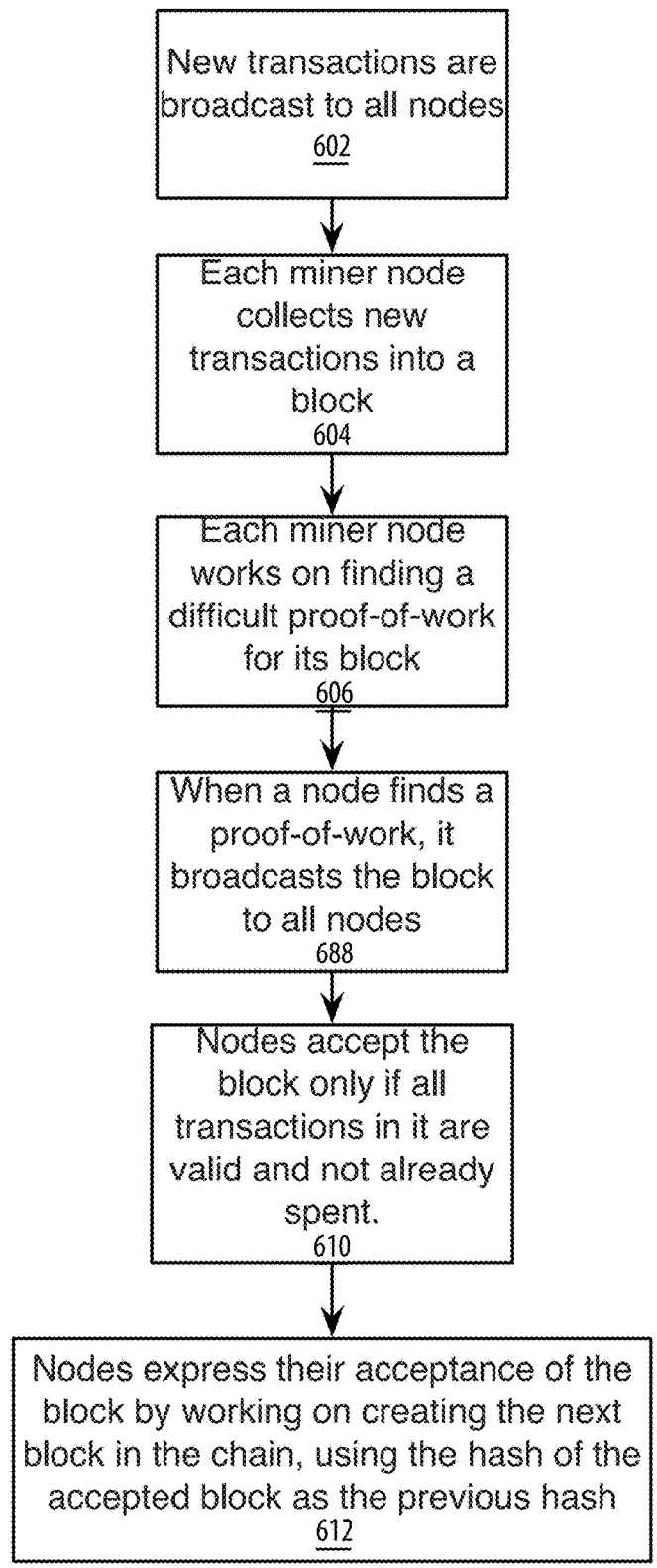
FIG. 6 shows a flowchart of a blockchain generation process for the SAFETPA.

FIG. 6 shows a flowchart of a blockchain generation process for the SAFETPA. New transactions are broadcast to all nodes (step 602). Each miner node collects new transactions into a block (step 604). Each miner node works on finding a difficult proof-of-work for its block (step 606). When a node finds a proof-of-work, it broadcasts the block to all nodes (step 608). Nodes accept the block only if all transactions in it are valid and not already spent (step 610). Nodes express their acceptance of the block by working on creating the next block in the chain, using the hash of the accepted block as the previous hash (step 612).

Transaction confirmation is needed to prevent double spending of the same money. After a transaction is broadcast to the SAFETPA network, it may be included in a block that is published to the network. When that happens it is said that the transaction has been mined at a depth of one block. With each subsequent block that is found, the number of blocks deep is increased by one. To be secure against double spending, a transaction should not be considered as confirmed until it is a certain number of blocks deep. This feature was introduced to protect the system from repeated spending of the same coins (double-spending). Inclusion of transaction in the block happens along with the process of mining.

The SAFETPA server 1801 may show a transaction as "unconfirmed" until the transaction is, for example, six blocks deep in the blockchain. Sites or services that accept virtual currency as payment for their products or services can set their own limits on how many blocks are needed to be found to confirm a transaction. However, the number six was specified deliberately. It is based on a theory that there's low probability of wrongdoers being able to a mass more than 10% of entire network's hash rate for purposes of transaction falsification and an insignificant risk (lower than 0.1%) is acceptable. For offenders who don't possess significant computing power, six confirmations are an insurmountable obstacle with readily accessible computing technology. In their turn people who possess more than 10% of network power aren't going to find it hard to get six confirmations in a row. However, to obtain such a power would require millions of dollars' worth of upfront investments, which significantly defers the undertaking of an attack. Virtual currency that is distributed by the network for finding a block can only be used after, e.g., one hundred discovered blocks.

Figure 7:
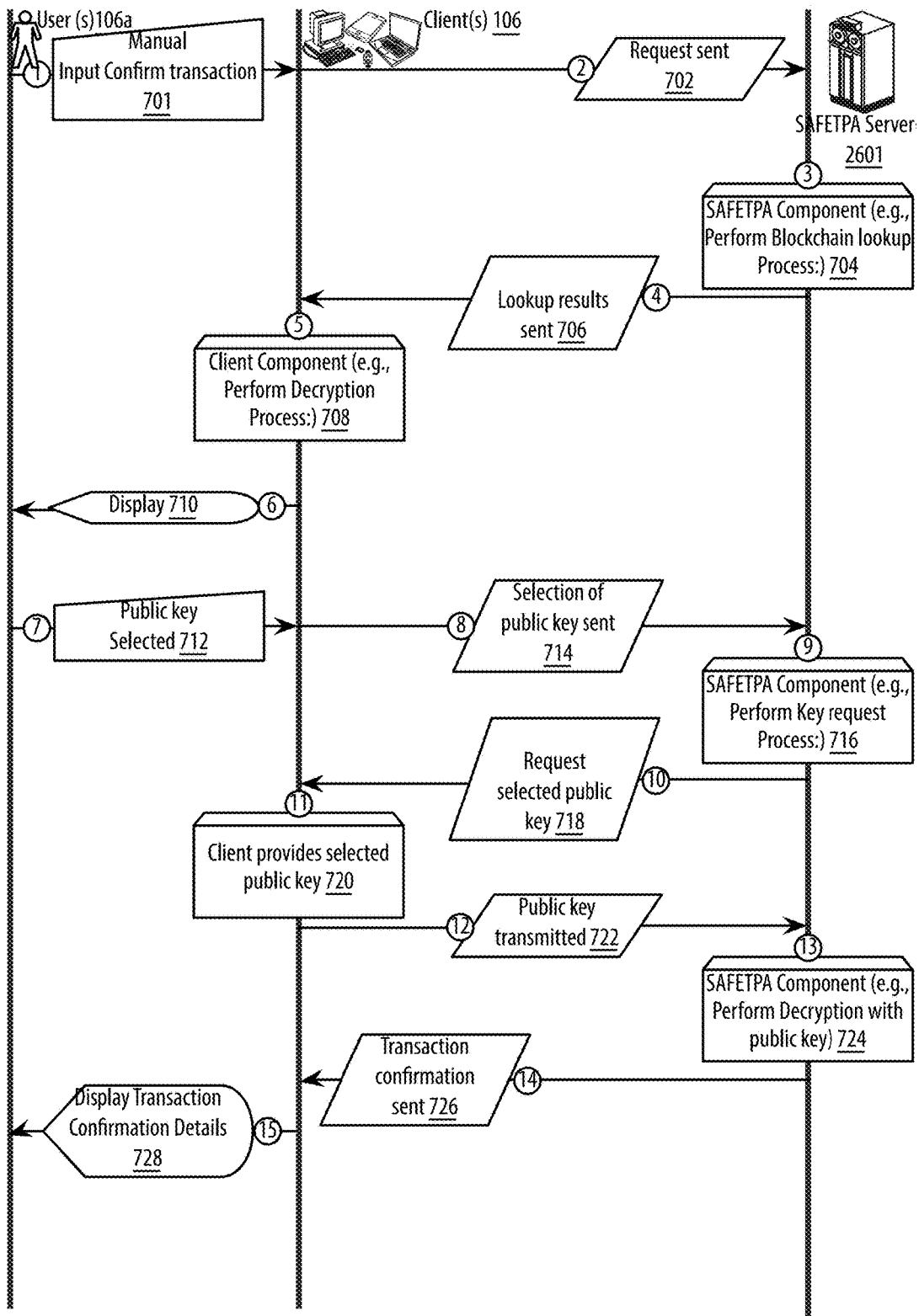
FIG. 7 shows a flowchart of a blockchain auditing process for the SAFETPA.

FIG. 7 shows a flowchart of a blockchain auditing process for the SAFETPA. The process commences when a client inputs a request to confirm a transaction (step 701). The client may select, enter, retrieve or otherwise provide a public key corresponding to the payer or payee of a transaction or transactions to be audited.

Next, the request is transmitted to the SAFETPA (step 702). In response, the SAFETPA Component performs a Blockchain lookup Process using the public key and other information provided (step 704).

The lookup results are then sent to client (step 706). The client next transmits a Decryption Process request (step 708). Responsively, a request to select a public key is displayed to the client (step 710) before the decryption process can commence.

Next, at step 712, the user inputs a selection of a stored public key. The selection of the public key is then sent to SAFETPA (step 714). Responsively, the SAFETPA Component performs a Key Comparison Request process (step 716). The SAFETPA then requests the selected public key from the processor of the client 106 (step 718). The client 106 responsively retrieves the selected public key from a memory of the client 106 (step 720). The public key is then transmitted to the SAFETPA (step 722). The SAFETPA Component then decrypts the transaction record in the stored blockchain using the public key (step 724). The decryption results are transmitted to the client 106 (step 726), which, in turn, displays the transaction confirmation details to the user 106a on a display of the client 106 or the like (step 728). This auditing process then ends.

Figure 8:
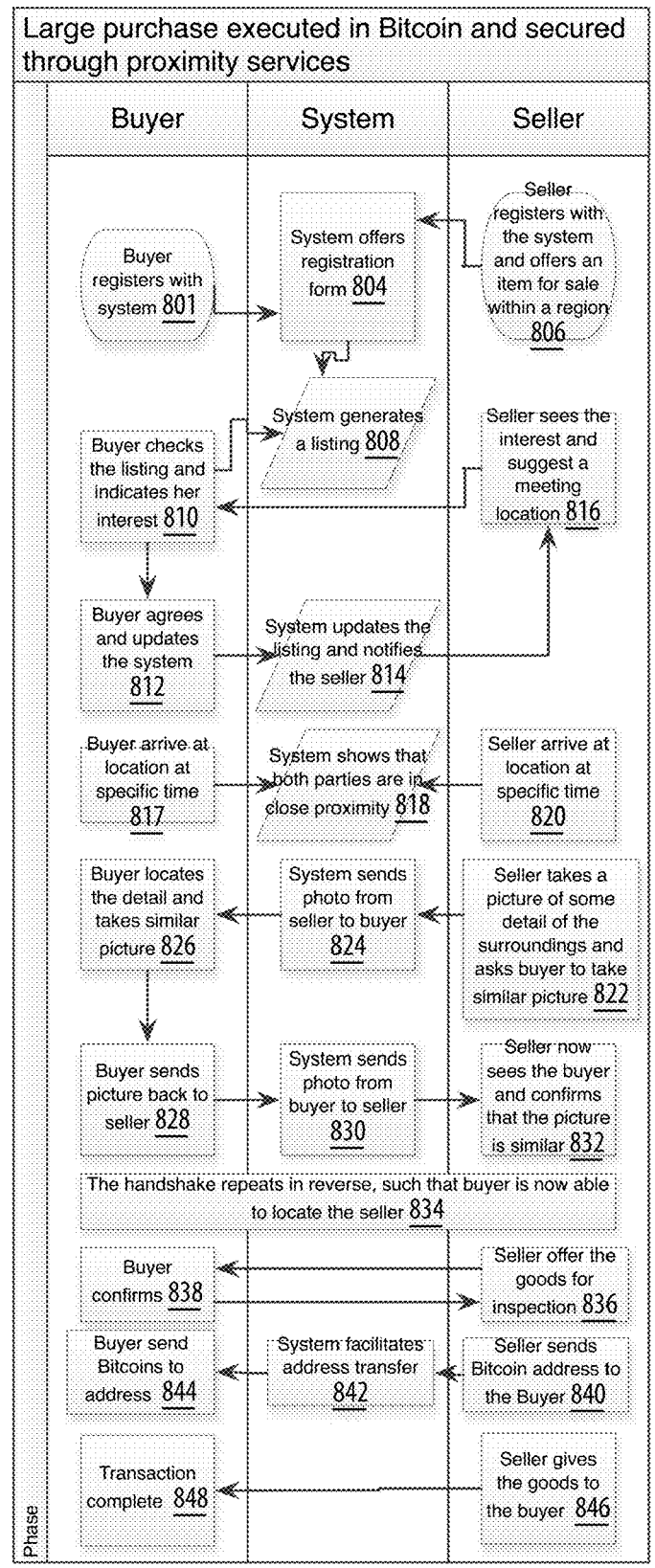
FIG. 8 shows a flowchart of a virtual currency transaction process for the SAFETPA.

FIG. 8 shows a flowchart of a virtual currency transaction process between a buyer and a seller using the SAFETPA. At a commencement of the process, a buyer (ie., a payer) requests registration with the SAFETPA system (step 801). In response, the SAFETPA serves a registration form for completion by the buyer (step 804). The registration form may include an identification of the buyer, the buyers wallet, and a source of funds to be established in the wallet.

Likewise, a seller (ie., a payee) registers with the system and offers an item for sale locally (step 806). The SAFETPA may generate a listing for the seller's item that is accessible to other users of the SAFETPA (step 808). Alternatively, or in addition thereto, the listing may provided at a physical or virtual location other than through the SAFETPA. The buyer, at any later point, checks the listing and indicates her interest in the item (step 810). The SAFETPA updates the listing and notifies the seller (step 814). The seller sees the interest and suggests a meeting location to the buyer via the SAFETPA (step 816). The buyer agrees and notifies the seller via the SAFETPA (step 812).

Next, the Buyer arrives at the agreed upon location at the designated time (step 817). Using a beacon or NFC, as described herein, or similar means, the SAFETPA may be able to determine when both parties are in close proximity (step 818) and begin the transaction there-between, for example, on their respective portable electronic devices.

Alternatively, the buyer and seller may determine their proximity directly in any of a variety of manners. For example, the seller may arrive or otherwise be established or open at physical location at a specified time (step 820). Seller takes a picture of some detail of the surroundings and asks buyer to take a similar picture (step 822). The SAFETPA sends the photo from the seller to the buyer (step 824). The buyer may then locate a detail in the received picture and take a similar picture of the detail (step 826). The buyer sends his/her picture back to the SAFETPA (step 828). The SAFETPA responsively sends the photo from the buyer to the seller (step 830). The seller confirms that the picture is similar and locates the buyer at the location (step 832). The handshake may also be repeated in reverse, such that buyer is able to locate the seller in a similar manner to the foregoing (step 834).

When the buyer and seller meet, the seller may then offer the goods for inspection by the buyer (step 836). The buyer then confirms that the item is acceptable (step 838). The seller then sends a virtual currency address from the seller's wallet to the Buyer via the SAFETPA (step 840). Responsively, the SAFETPA forwards the address to the buyer (step 842). The buyer then sends the agreed-upon denomination of virtual currency from the buyer's wallet address to the seller's address (step 844). Once the transaction is confirmed, for example, by auditing the SAFETPA blockchain according to FIG. 7, the seller gives the goods to the buyer (step 846). The transaction then ends (step 848).

Figure 9:
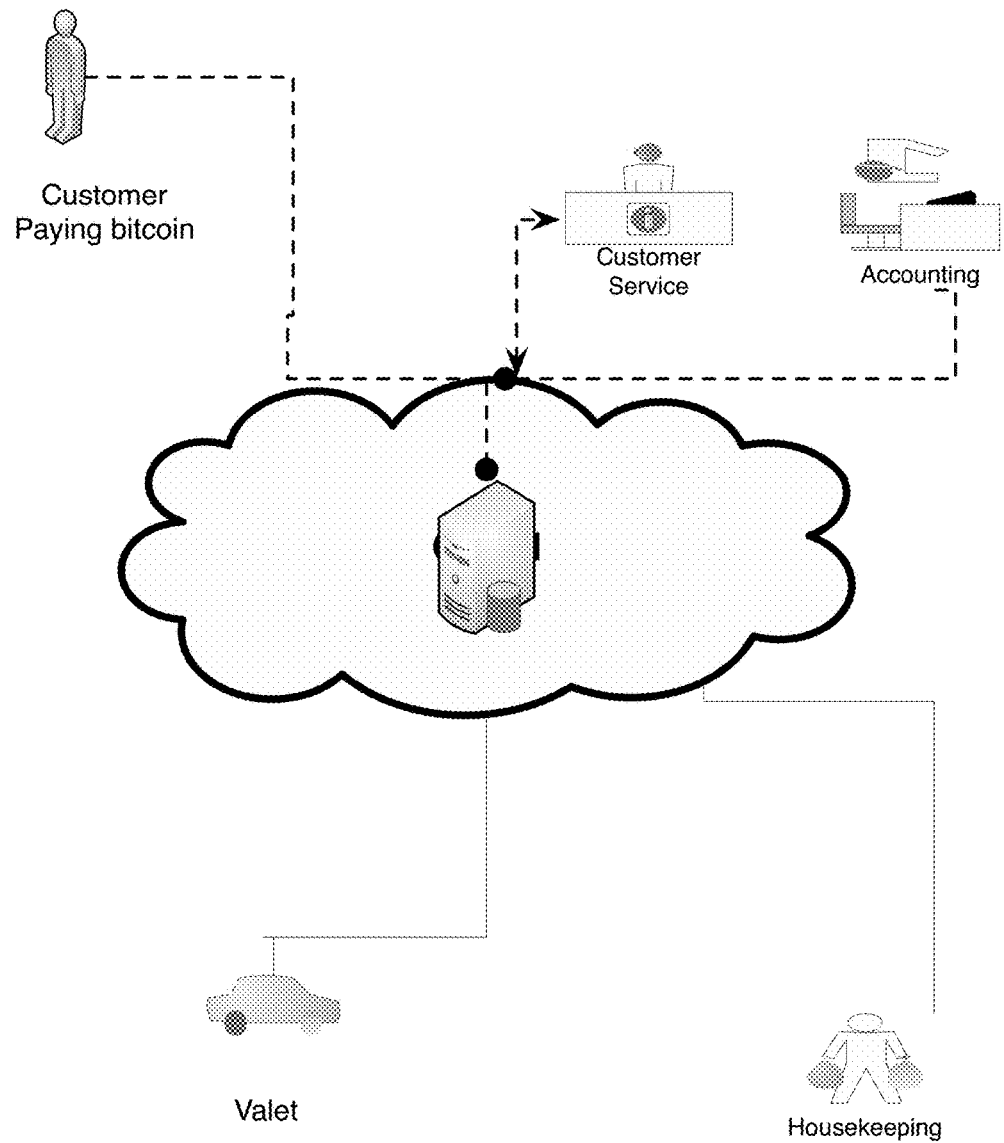
FIG. 9 shows a Bluetooth or NFC-enabled environment for enabling a SAFETPA transaction.

FIG. 9 shows a Bluetooth or NFC-enabled environment for enabling a SAFETPA transaction, such as the transactions described in FIG. 8. Using Bluetooth or NFC beacons, various people and systems can be paid where real-world cash would normally be used, such as the valet, housekeeper at a hotel. In addition, by binding a smartphone or other portable electronic device to a hotel room upon entry, and then de-binding on exit, a hotel customer can keep very granular track of usage and payments with a seamless, friction-free payment and accounting system.

Figure 10:
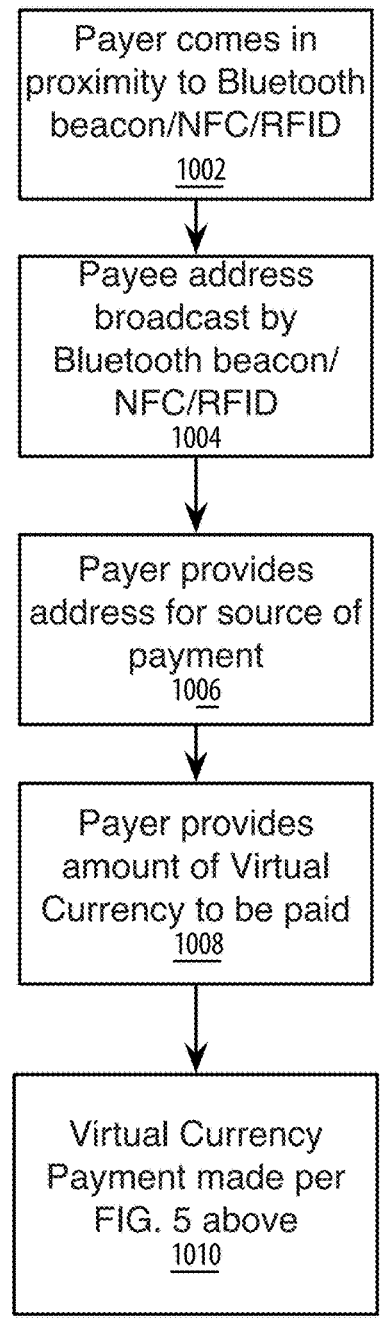
FIG. 10 shows a flowchart of a Bluetooth payment process for the SAFETPA.

FIG. 10 shows a flowchart of a Bluetooth payment process for the SAFETPA in an environment such as FIG. 9, where the location of the payee is fixed to a particular locale or property. At a commencement of the process, a payer comes in proximity to a bluetooth or NFC beacon established on the property (step 1002), where a payee's virtual currency address is broadcast by the beacon (step 1004). The payer provides a source address for a virtual currency payment (step 1006). The payer authorizes an amount of payment to be made in denominations of the virtual currency (step 1008). This virtual currency payment may then be completed in accordance with FIG. 5 above (step 1010).

Figure 11:
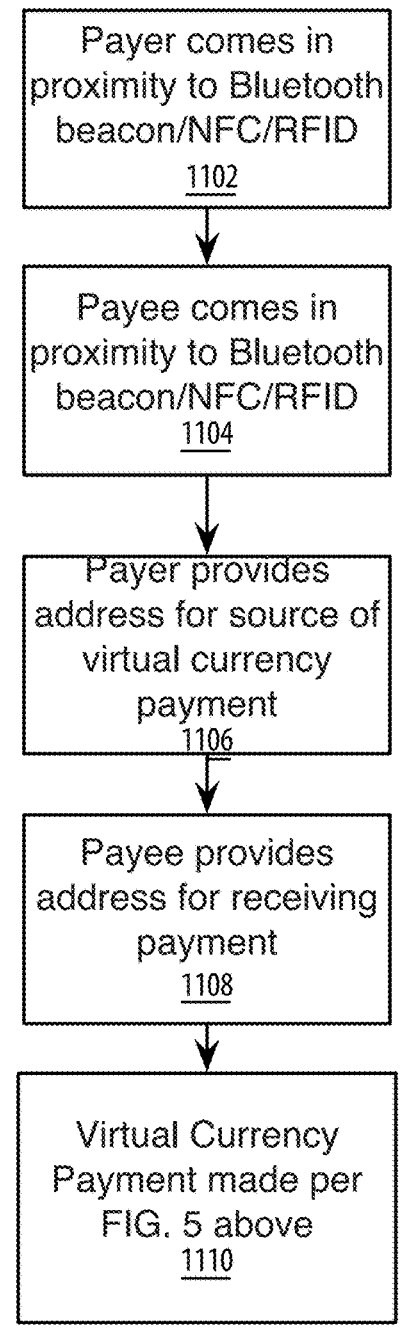
FIG. 11 shows a flowchart of a Bluetooth inter-party payment process for the SAFETPA.

FIG. 11 shows a flowchart of a Bluetooth or NFC interparty payment process enabled by the SAFETPA. A payer comes in proximity to a third-party Bluetooth or NFC beacon (step 1102). A payee comes in proximity to the same beacon (step 1104). The payer provides his address as a source of virtual currency payment (step 1106). The payee provides a destination address corresponding to the seller's wallet for receiving payment of the virtual currency (step 1108). The virtual currency payment may then be made in accordance with FIG. 5 above (step 1110).

Figure 12:
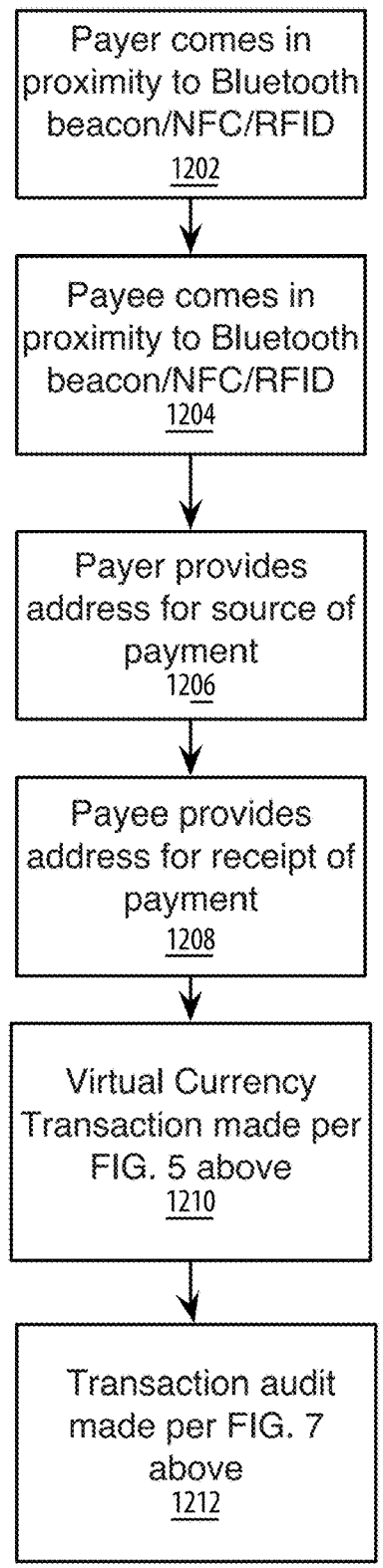
FIG. 12 shows a flowchart of a verified payment process for the SAFETPA.

FIG. 12 shows a flowchart of a verified payment process for the SAFETPA. A payer comes in proximity to a third-party Bluetooth or NFC beacon (step 1202). A payee comes in proximity to the same beacon (step 1204). The payer provides his address as a source of virtual currency payment (step 1206). The payee provides a destination address corresponding to the seller's wallet for receiving payment of the virtual currency (step 1208). The virtual currency payment may then be made in accordance with FIG. 5 above (step 1110). The transaction may then be verified according to the auditing process described in FIG. 7 above.

Figure 13:
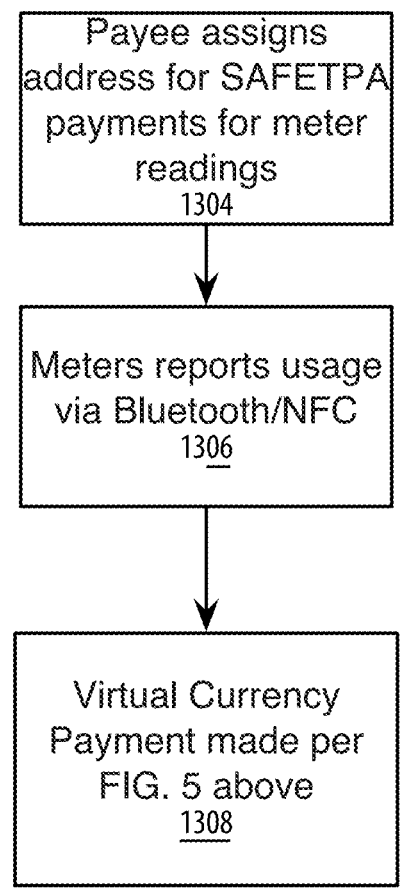
FIG. 13 shows a flowchart of a meter reading process for the SAFETPA.

FIG. 13 shows a flowchart of a meter reading process enabled by the SAFETPA. At a commencement of this process, a payee assigns a wallet address for SAFETPA payments for meter readings (step 1304). For instance, the meters may represent gas, oil, water, electricity and/or other residential or commercial resource monitors that may be established and installed by utility companies, government agencies and the like. The meters reports usage via Bluetooth/NFC in communication or integrated with one or more of the meters. (step 1306). A virtual currency payment is then made periodically to cover resource usage in accordance with FIG. 5 above (step 1308).

Figure 14:
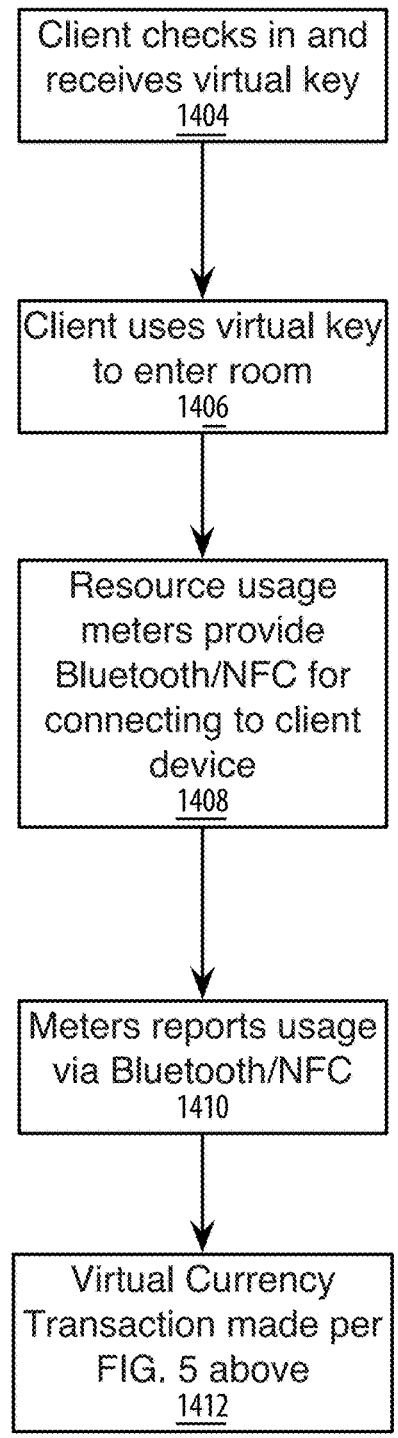
FIG. 14 shows a flowchart of a resource monitoring process for the SAFETPA.

FIG. 14 shows a flowchart of a hotel resource monitoring process enabled by the SAFETPA. At a commencement of this process, a hotel customer checks in and, after providing a wallet address for a source of virtual currency payment, receives on his smartphone or portable electronic device a virtual key that may be used in conjunction with Bluetooth or NFC beacons to gain access to the customer's hotel room (step 1404). Next, the customer uses virtual key to enter the room (Step 1406). Resource usage meters in the room provide a beacon for connecting to the customer's device (step 1408). The meters report resource usage via Bluetooth/NFC to both the customer's device and to the SAFETPA (step 1410). Upon check out, a payment based on resource usage may then be made in accordance with FIG. 5 above (step 1412).

Figure 15:
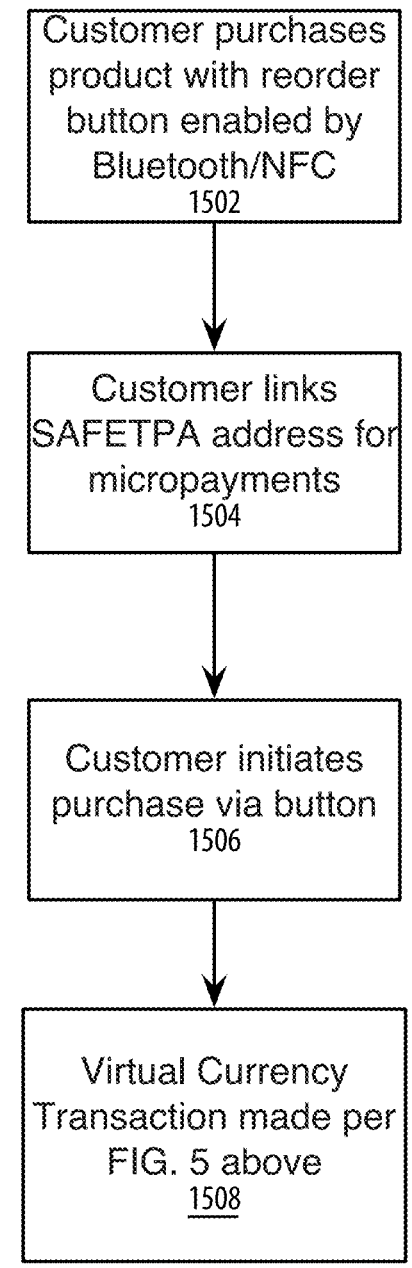
FIG. 15 shows a flowchart of a micropayment button payment process for the SAFETPA.

FIG. 15 shows a flowchart of a micropayment button payment process for the SAFETPA. A customer may purchase a product having a re-order button enabled by Bluetooth/NFC (step 1502). One example of such functionality is provided by AMAZON DASH. As with the foregoing embodiments, such functionality may likewise be provided by Radio Frequency Identification (RFID) tags, NFC and other local code reading devices. The customer then links a SAFETPA address for issuing micropayments in order to replenish the product on demand (step 1504). The customer initiates a purchase via the button (step 1506). A virtual currency payment may then be made in accordance with FIG. 5 above (step 1508).

Figure 16:
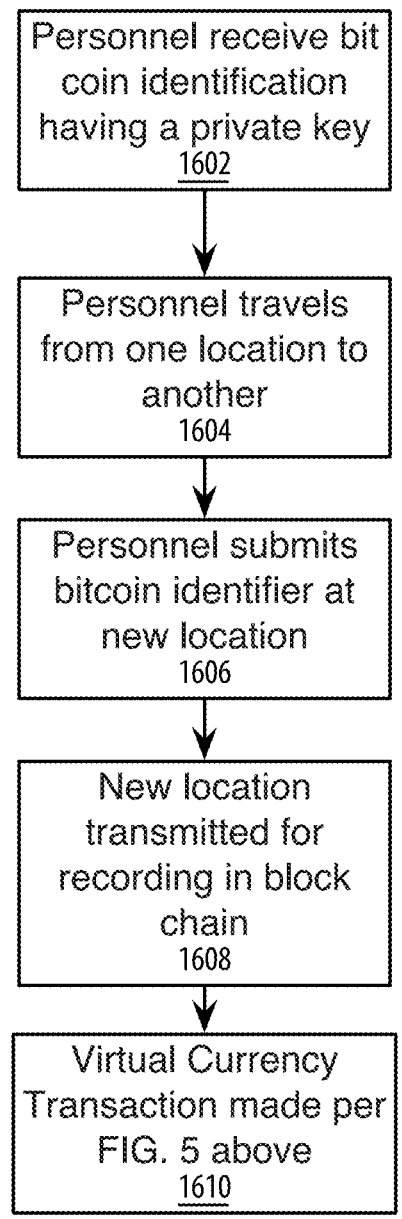
FIG. 16 shows a flowchart of a personnel tracking process for the SAFETPA.

FIG. 16 shows a flowchart of a non-monetary personnel or item tracking process enabled by the SAFETPA. At the start of such process, a person or item is assigned a virtual identifier in the form of a private key (step 1602). In various embodiments involving the tracking of personnel, biometric data of a person can be used as the identifier, or otherwise incorporated into the identifier. The biometric data may include retinal scan or fingerprint scan data, facial recognition technology and other known and useful biometric identifications. All or a meaningful portion of the biometric data may be used in the public key assigned to the person. Other similar implementations are readily contemplated.

Next, the person or item then travels from one location to another (step 1604). The person or item then submits the virtual identifies at a new geographic location (step 1606). The new location is transmitted to the SAFETPA for recording in the block chain (step 1608). The process then ends 1610.

In non-monetary transactions, a virtual token can convey particularized information using OP Return codes or the like. Such field can place bits of information into the transaction's scriptSig value so that the irreversibility of the blockchain can be used to make that information verifiable at later times. OP_RETURN is a valid opcode to be used in a bitcoin transaction, which allows 80 arbitrary bytes to be used in an unspendable transaction.

An exemplary transaction which has an OP_RETURN in its scriptSig, the hash of which may be for example, a text string such as:

8bae12b5f4c888d940733dcd1455efc6a3a69cf9340e17a981286d3778615684

A command entered into a node of the SAFETPA, such as:
$>bitcoind getrawtransaction
8bae12b5f4c888d940733dcd1455efc6a3a69cf9340e17a981286d3778615684 would yield the following output.

```
{
"hex":
"0100000001c858ba5f607d762fe5be1dfe97ddc121827895c2562c4348d69d02b91dbb408e0100
```

-continued

```
00008b4830450220446df4e6b875af246800c8c976de7cd6d7d95016c4a8f7bcdbba81679cbda24
2022100c1ccfacfeb5e83087894aa8d9e37b11f5c054a75d030d5bfd94d17c5bc953d4a01410459
01f6367ea950a5665335065342b952c5d5d60607b3cdc6c69a03df1a6b915aa02eb5e07095a2548
a98dcdd84d875c6a3e130bafadfd45e694a3474e71405a4ffffffff020000000000000000156a13
636861726c6579206c6f766573206865696469400d0300000000001976a914b8268ce4d481413c4
e848ff353cd16104291c45b88ac00000000",
"txid" : "8bae12b5f4c088d940733dcd1455efc6a3a69cf9340e17a981286d3778615684",
"version" : 1,
"locktime" : 0,
"vin" : [
    {
        "txid" :
"8e40bb1db9029dd648432c56c295788221c1dd97fe1dbee52f767d605fba58c8",
        "vout" : 1,
        "scriptSig" :
            "asm" :
"30450220446df4e6b875af246800c8c976de7cd6d7d95016c4a8f7bcdbba81679cbda242022100
c1ccfacfeb5e83087894aa8d9e37b11f5c054a75d030d5bfd94d17c5bc953d4a01
045901f6367ea950a5665335065342b952c5d5d60607b3cdc6c69a03df1a6b915aa02eb5e07095a
2548a98dcdd84d875c6a3e130bafadfd45e694a3474e71405a4",
            "hex" :
"4830450220446df4e6b875af246800c8c976de7cd6d7d95016c4a8f7bcdbba81679cbda2420221
00c1ccfacfeb5e83087894aa8d9e37b11f5c054a75d030d5bfd94d17c5bc953d4a0141045901f63
67ea950a5665335065342b952c5d5d60607b3cdc6c69a03df1a6b915aa02eb5e07095a2548a98dc
dd84d875c6a3e130bafadfd45e694a3474e71405a4"
        },
        "sequence" : 4294967295
    }
],
"vout" : [
    {
        "value" : 0.00000000,
        "n" : 0,
        "scriptPubKey" : {
            "asm" : "OP_RETURN 636861726c6579206c6f766573206865696469",
            "hex" : "6a13636861726c6579206c6f766573206865696469",
            "type" : "nulldata"
        }
    },
    {
        "value" : 0.00200000,
        "n" : 1,
        "scriptPubKey" : {
            "asm" : "OP_DUP" OP_HASH160 b8268ce4d481413c4e848ff353cd16104291c45b
OP_EQUALVERIFY OP_CHECKSIG",
            "hex" : "76a914b8268ce4d481413c4e848ff353cd16104291c45b88ac",
            "reqSigs" : 1,
            "type" : "pubkeyhash",
            "addresses" : [
                "1HnhWpkMHMjgt167kvgcPyurMmsCQ2WPgg"
            ]
        }
    }
],
"blockhash :
"000000000000000004c31376d7619bf0f0d65af6fb028d3b4a410ea39d22554c",
"confirmations" : 2655,
"time" : 1404107109,
"blocktime" : 1404107109
```

The OP_RETURN code above is represented by the hex value 0x6a. This first byte is followed by a byte that represents the length of the rest of the bytes in the scriptPubKey. In this case, the hex value is 0x13, which means there are 19 more bytes. These bytes comprise the arbitrary less-than-80 bytes one may be allowed to send in a transaction marked by the OP_RETURN opcode.

For purposes of personnel tracking, the virtual currency distributed by the SAFETPA system may include the following data fields in conjunction with OP Return Code mechanism:

Unique Identifier (UN-ID) Code 18 positions (non-rewriteable)
GPS start location 28 positions (non-rewriteable)
GPS inter location 28 positions (this field can keep changing)
GPS final location 28 positions (cannot change)
Name 14 positions
Gender 1 position (M/F)
Age at assignment 2 positions
Examples:
UN-ID code 8123456789
GPS Start Location 36.8166788, −1.2833388
GPS inter location 38.897789, −77.836543
GPS final location 41.283521, −78.899466
Name Doe, John
Gender M
Age at assignment 53

Each person is provided a unique identifier in addition to any government issued documentation associated with the person. The SAFETPA blockchain database 1819*j* stores and maintains records from the person's departing country along with a photo, a recording, voiceprint, and/or other biometric identification of person along with the established identifier. At a later date, the SAFETPA can access the Block Chain publicly, and personnel location can be transparent and tracked.

In an additional example, the 80-byte header containing personnel tracking information recorded in the blockchain may take the following form in an XML-enabled format.

```
<?xml version="1.0" ?>
<ROWSET>
<ROW>
<UN_ID_Code>GPS Start location (low precision)</UN_ID_Code>
<10_-_numeric>12 numeric</10_-_numeric>
<123456789>36.8166, -1.2833</123456789>
</ROW>
<ROW>
<UN_ID_Code>GPS inter location</UN_ID_Code>
<10_-_numeric>12 numeric</10_-_numeric>
<123456789>38.8977,-77. 8363</123456789>
</ROW>
<ROW>
<UN_ID_Code>GPS final location </UN_ID_Code>
<10_-_numeric>12 numeric</10_-_numeric>
<123456789>41.283521, -78.8999</123456789>
</ROW>
<ROW>
<UN_ID_Code>Name</UN_ID_Code>
<10_-_numeric>14 alpa</10_-_numeric>
<123456789>Obama, Barack, H</123456789>
</ROW>
<ROW>
<UN_ID_Code>Gender</UN_ID_Code>
<10_-_numeric>N/F</10_-_numeric>
<123456789>M</123456789>
</ROW>
<ROW>
<UN_ID_Code>Age at Assignment</UN_ID_Code>
<10_-_numeric>2 numeric</10_-_numeric>
<123456789>53</123456789>
</ROW>
<ROW>
<UN_ID_Code>Filler</UN_ID_Code>
<10_-_numeric>17 blank</10_-_numeric>
<123456789></123456789>
</ROW>
<ROW>
<UN_ID_Code></UN_ID_Code>
<10_-_numeric>63 positions</10_-_numeric>
<123456789></123456789>
</ROW>
</ROWSET>
```

The foregoing exemplary XML datastructure can be represented by the following table of its field names, field types, field sizes and field data:

| Field Name | Field size/type | Field Data |
| --- | --- | --- |
| UN ID Code | 10 numeric | 123456789 |
| GPS Start location (low precision) | 12 numeric | 36.81, -1.28 |
| GPS inter location | 12 numeric | 38.89, -77.03 |
| GPS final location | 12 numeric | 41.28, -70.09 |
| Name | 14 alpha | Obama, Barack, H |
| Gender | M/F | M |
| Age at Assignment | 2 numeric | 53 |
| Filler | 17 blank 80 positions | |

In a further example, the 80-byte header containing personnel tracking information recorded in the blockchain may take the following form in an XML-enabled format.

```
<?xml version="1.0" ?>
<ROWSET>
<ROW>
<UN_ID_Code>GPS Start location (low precision)</UN_ID_Code>
<10_-_numeric>12 numeric</10-_numeric>
<1323249998>35.8864, -78.8589</1323249998>
</ROW>
<ROW>
<UN_ID_Code>GPS inter location</UN_ID_Code>
<10_-_numeric>12 numeric</10_-_numeric>
<1323249998>53.1355, -57.6684</1323249998>
</ROW>
<ROW>
<UN_ID_Code>GPS final location </UN_ID_Code>
<10_-_numeric>12 numeric</10_-_numeric>
<1323249998>42.333, -71.487</1323249998>
</ROW>
<ROW>
<UN_ID_Code>Name</UN_ID_Code>
<10_-_numeric>20 alpa</10_-_numeric>
<1323249990>Fitzgerald, Michael</1323249998>
</ROW>
<ROW>
<UN_ID_Code>Gender</UN_ID_Code>
<10_-_numeric>N/F</10_-_numeric>
<1323249998>M</132324999>
</ROW>
<ROW>
<UN_ID_Code>Age at Assignment</UN_ID_Code>
<10_-_numeric>2 numeric</10_-_numeric>
<1323249998>12</1323249998>
</ROW>
<ROW>
<UN_ID_Code>Filler</UN_ID_Code>
<10_-_numeric>11 blank</10_-_numeric>
<1323249998></1323249998>
</ROW>
<ROW>
<UN_ID_Code></UN_ID_Code>
<10_-_numeric>80 positions</10_-_numeric>
<1323249990></1323249998>
</ROW>
</ROWSET>
```

The foregoing exemplary XML datastructure can be represented by the following table of its field names, field types, field sizes and field data:

| Field Name | Field size/type | Field Data |
| --- | --- | --- |
| UN ID Code | 10 numeric | 1323249990 |
| GPS Start location (low precision) | 12 numeric | 35.88, -78.85 |

| Field Name | Field size/type | Field Data |
|---|---|---|
| GPS inter location | 12 numeric | 53.13, −57.66 |
| GPS final location | 12 numeric | 42.33, −71.04 |
| Name | 20 alpha | Fitzgerald, Michael |
| Gender | M/F | M |
| Age at Assignment | 2 numeric | 12 |
| Filler | 11 blank 80 positions | |

In a still further example, the 80-byte header containing personnel tracking information recorded in the blockchain may take the following form in an XML-enabled format:

<?xml version="1.0"?>
<ROWSET>
<ROW>
<UN_ID_Code>GPS Start location (low precision)</UN_ID_Code>
<10_-_numeric>12 numeric</10_-_numeric>
<3102521980>37.5629, −122.325</310252198>
</ROW>
<ROW>
<UN_ID_Code>GPS inter location</UN_ID_Code>
<10_-_numeric>12 numeric</10_-_numeric>
<3102521980>42.2808, −83.7430</3102521988>
</ROW>
<ROW>
<UN_ID_Code>GPS final location </UN_ID_Code>
<10_-_numeric>12 numeric</10_-_numeric>
<3182521988>42.3317, −71.1211</3182521988>
</ROW>
<ROW>
<UN_ID_Code>Name</UN_ID_Code>
<10_-_numeric>20 alpa</10_-_numeric>
<3102521980>Brady, Thomas </3102521988>
</ROW>
<ROW>
<UN_ID_Code>Gender</UN_ID_Code>
<10_-_numeric>N/F</10_-_numeric>
<3102521980>M</310252198>
</ROW>
<ROW>
<UN_ID_Code>Age at Assignment</UN_ID_Code>
<10_-_numeric>2 numeric</10_-_numeric>
<3102521980>38</310252198>
</ROW>
<ROW>
<UN_ID_Code>Filler</UN_ID_Code>
<10_-_numeric>11 blank</11_-_numeric>
<3102521980></310252198>
</ROW>
<ROW>
<UN_ID_Code></UN_ID_Code>
<10_-_numeric>80 positions</10_-_numeric>
<3102521980></310252198>
</ROW>
</ROWSET>

The foregoing exemplary XML datastructure can be represented by the following table of its field names, field types, field sizes and field data:

| Field Name | Field size/type | Field Data |
|---|---|---|
| UN ID Code | 10 numeric | 3102521980 |
| GPS Start location (low precision) | 12 numeric | 37.56, −122.32 |
| GPS inter location | 12 numeric | 42.08, −83.74 |
| GPS final location | 12 numeric | 42.37, −71.12 |
| Name | 20 alpha | Brady, Thomas |
| Gender | M/F | M |
| Age at Assignment | 2 numeric | 38 |
| Filler | 11 blank 80 positions | |

Another useful datastructure for personnel tracking can be represented by the following exemplary table of field names, field types, field sizes and field data (the corresponding XML datastructure is similar to those examples provided in the foregoing):

| Field | Purpose | Updated when . . . | Type | Size | Example |
|---|---|---|---|---|---|
| UN-ID Code | 10 positions (should not change) | Never changes | Integer | 10 | 123456789 |
| GPS start location | 20 positions (cannot change) | Never changes | Double Int | 20 | 38.897709, −77.036543 |
| GPS Inter location | 20 positions (this field can keep changing) | Per update on location | Double Int | 20 | −1.81508, −3.0306 |
| GPS final location | 20 positions (this field can keep changing) | Per update on location | Double Int | 20 | 40.712784, −74.005941 |
| Name | Current target in compact format | Never changes | Char | 14 | John S Smith |
| Gender | Gender M/F | Gender change | Bolean | 1 | M |
| Age at assignment | 16-bit number (starts at 0) | At assignement | Integer | 2 | 42 |

In an additional monetary example, an 80-byte header containing transaction information to be recorded in the blockchain may take the following form in an XML-enabled format: <?xml version="1.0" ?>
<ROWSET>
<ROW>
<Purpose></Purpose>
<Updated_when_◆ ></Updated_when_◆ >
<FIELD◆ >Type</FIELD4>
<Size></Size>
<Example></Example>
</ROW>
<ROW>
<Field>Version</Field>
<Purpose>Block version number</Purpose>
<Updated_when_◆ >When software upgraded</Updated_when_◆ >

```
<FIELD� >Integer</FIELD� >
<Size>� </Size>
<Example>1012</Example>
</ROW>
<ROW>
<Field></Field>
<Purpose></Purpose>
<Updated_when_� ></Updated_when_� >
<FIELD� ></FIELD� >
<Size></Size>
<Example></Example>
</ROW>
<ROW>
<Field>Stock Code</Field>
<Purpose>256-bit hash of the previous block header</Purpose>
<Updated_when_� >Stock Symbol; Exchange; Amount (% share)</Updated_when_� >
<FIELD� >Char</FIELD� >
<Size>32</Size>
<Example>G00G.;NASDAQ: 0.00023</Example>
</ROW>
<Field></Field>
<Purpose></Purpose>
<Updated_when_� ></Updated_when_� >
<FIELD� ></FIELD� >
<Size></Size>
<Exampe></Example>
<Field>Op_Return </Field>
<Purpose>256-bit hash based on all of the transactions in the block (aka checksum)</Purpose>
<Updated_when_� >A transaction is accepted</Updated_when_� >
<FIELD� >Double Int</FIELD� >
<Size>32</Size>
<Exampte>0x444f4350524f4f46</Exampte>
<Field></Field>
<Purpose></Purpose>
<Updated_when_� ></Updated_when_� >
<FIELD� ></FIELD� >
<Size></Size>
<Exampte></Exampte>
<Field>Time</Field>
<Purpose>Current timestamp as seconds since 1970-01-01T00:00 UTC</Purpose>
<Uipdated when_� >Every few seconds</Updated_when_� >
<FIELD� >Int</FIELD� >
<Size>4</Size>
<Exampte>1444655572</Exampte>
<Field></Field>
<Purpose></Purpose>
<Updated_when_� ></Updated_when_� >
<FIELD� ></FIELD� >
<Size></Size>
<Exampte></Exampte>
</ROW>
<ROW>
<Field>Bits</Field>
<Purpose>Current target in compact format</Purpose>
<Updated_when_� >The difficulty is adjusted</Updated_when_� >
<FIELD� ></FIELD� >
<Size>4</Size>
<Example>484b4512</Example>
</ROW>
<ROW>
<Field></Field>
<Purpose></Purpose>
<Updated_when_� ></Updated_when_� >
<FIELD� ></FIELD� >
<Size>/Size>
<Example>/Example>
</ROW>
<ROW>
<Field>Nonce</Field>
<Purpose>32-bit number (starts at)</Purpose>
<Updated_when_� >A hash is tried (increments)</Updated_when_� >
<FIELD� ></FIELD� >
<Size>4</Size>
<Example>67953845</Example>
</ROW>
<ROW>
<Field></Field>
<Purpose></Purpose>
<Updated_when_� ></Updated_when_� >
<FIELD� ></FIELD� >
<Size>/Size>
<Example>/Example>
</ROW>
</ROWSET>
```

The foregoing exemplary XML datastructure can be represented by the following table of its field names, field types, field sizes and field data:

| Field | Purpose | Updated when . . . | Type | Size | Example |
|---|---|---|---|---|---|
| Version | Block version number | When upgraded | software | Integer | 4 |
| Stock Code | 256-bit hash of the previous block header | Stock Symbol; Exchange; Amount (% share) | Char | 32 | GOOG.; NASDAQ: 0.00023 |
| Op_Return | 256-bit hash based on all of the transactions in the block (aka checksum) | A transaction is accepted | Double Int | 32 | 0x444f4350524f4f46 |
| Time | Current timestamp as seconds since 1970-01-01T00:00 UTC | Every few seconds | Int | 4 | 1444655572 |
| Bits | Current target in compact format | The difficulty is adjusted | | | 4 |
| Nonce | 32-bit number (starts at 0) | A hash is tried (increments) | | | 4 |

Another useful datastructure for accomplishing transactions as described herein can be represented by the following exemplary table of field names, field types, field sizes and field data (the corresponding XML datastructure of which is similar to those examples provided in the foregoing):

| Field | Purpose | Updated when . . . | Type | Size | Example |
|---|---|---|---|---|---|
| Sender Wireless ID | Block version number | MAC address IP v6 | 128 bit | 16 | 2001:0D88:AC10:FD01:0000:0000:0000:0000 (Hex) |
| Receiver Wireless ID | Block version number | MAC address IP v6 | 128 bit | 16 | 2001:0D88:AC10:FD01:0000:0000:0000:0000 (Hex) |
| SenderID | 256-bit hash of the previous header | A new block block comes in | Double | 10 | a7ffc6f8bfied76651c14756a061d662f580ff4de43b49fa82d80a4b80f8434a |
| Receiver Public Key | 256-bit hash based on all of the transactions in the block (aka checksum) | A transaction is accepted | Double | 10 | b7efc6f7bfied76441c146568f61d662f580ff4de43b49fa82d80a4b80f3245c |
| hashMerkle Root | 256-bit hash based on all of the transactions in the block (aka checksum) | A transaction is accepted | Double | 16 | $20 |
| Time | Current timestamp as seconds since 1970-01-01T00:00 UTC | Every few seconds | Int | 4 | 1444655572 |
| Bits | Current target in compact format | The difficulty is adjusted | Int | 4 | 8 |
| Nonce | 32-bit number (starts at 0) | A hash is tried (increments) | Int | 4 | 25 |

Another useful datastructure for accomplishing transactions as described herein can be represented by the following exemplary table of field names, field types, field sizes and field data (the corresponding XML datastructure of which is similar to those examples provided in the foregoing):

| Field | Purpose | Updated when . . . | Type | Size | Example |
|---|---|---|---|---|---|
| Sender Wireless ID | Block version number | MAC address IP v6 | 128 bit | 16 | 2001:0D88:AC10:FD01:0000:0000:0000:0000 (Hex) |
| Receiver Wireless ID | Block version number | MAC address IP v6 | 128 bit | 16 | 2001:0D88:AC10:FD01:0000:0000:0000:0000 (Hex) |
| SenderID | 256-bit hash of the previous block header | A new block comes in | Double | 18 | a7ffc6f8bfied76651c14756a061d662f580ff4de43b49fa82d80a4b80f8434a |

-continued

| Field | Purpose | Updated when... | Type | Size | Example |
|---|---|---|---|---|---|
| Receiver Public Key | 256-bit hash of the previous block header based on all of the transactions in the block (aka checksum) | A transaction is accepted | Double | 18 | b7efc6f7bfied76441c146568f61d662f580ff4de43b49fa82d80a4b80f3245c |
| hashMerkle Root | 256-bit hash of the previous block header based on all of the transactions in the block (aka checksum) | A transaction is accepted | Double | 16 | $2,346 |
| Time | Current timestamp as seconds since 1970-01-01T00:00 UTC | Every few seconds | Int | 4 | 1444655572 |
| Bits | Current target in compact format | The difficulty is adjusted | Int | 4 | |
| Nonce | 32-bit number (starts at 0) | A hash is tried (increments) | Int | 4 | 25 |

Another useful datastructure for accomplishing transactions as described herein can be represented by the following exemplary table of field names, field types, field sizes and field data (the corresponding XML datastructure of which is similar to those examples provided in the foregoing):

| Field | Purpose | Updated when... | Type | Size | Example |
|---|---|---|---|---|---|
| Version | Block version number | When software upgraded | Integer | 4 | |
| hashNewAddr | 256-bit hash f New Address | A new block comes in | | 32 | a7ffc6f8bfled76651c14756a061d662f580ff4de43b49fa82d80a4b80f8434a |
| RandomNumHead | 256-bit hash based on all of the transactions in the block (aka checksum) | A transaction is accepted | | 32 | b7efc6f7bfled76441c146568f61d662f580ff4de43b49fa82d80a4b80f3245c |
| Time | Current timestamp as seconds since 1970-01-01T00:00 UTC | Every few seconds | Int | 4 | 1444655572 |
| Bits | Current target in compact format | The difficulty is adjusted | | 4 | |

-continued

| Field | Purpose | Updated when . . . | Type | Size | Example |
|---|---|---|---|---|---|
| Nonce | 32-bit number (starts at 0) | A hash is tried (increments) | | 4 | |

Figure 17:
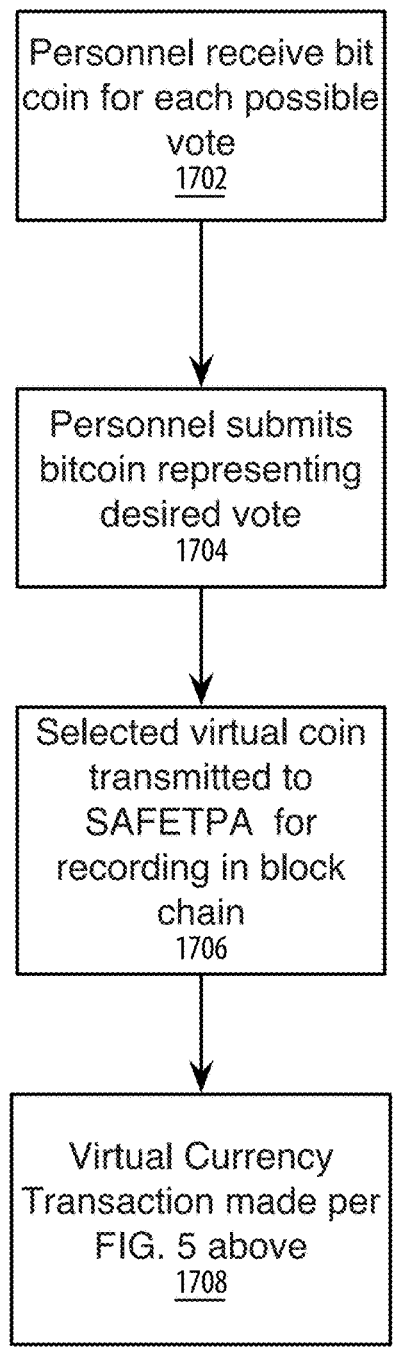
FIG. 17 shows a flowchart of a voting process for the SAFETPA.

FIG. 17 shows a flowchart of a voting process for the SAFETPA. At a commencement of this process, appropriate personnel may receive a virtual coin representing each possible vote (step 1702). Each virtual coin may contain a hash of the person's SAFETPA identifier and the desired vote. The virtual coin would have no real or virtual currency associated with it. Each person submits a single virtual coin representing his or her desired vote (step 1704). The selected bit coin is transmitted to the SAFETPA for recording in the block chain established for the vote (step 1706). This coin-enabled transaction may then be made in a similar manner as virtual currency transaction as described with respect to FIG. 5 above (step 1708). In various embodiments, the unused voting coins may be invalidated by the SAFETPA upon the submission and validation of one of the virtual coins represented by the desired vote.

Figure 18:
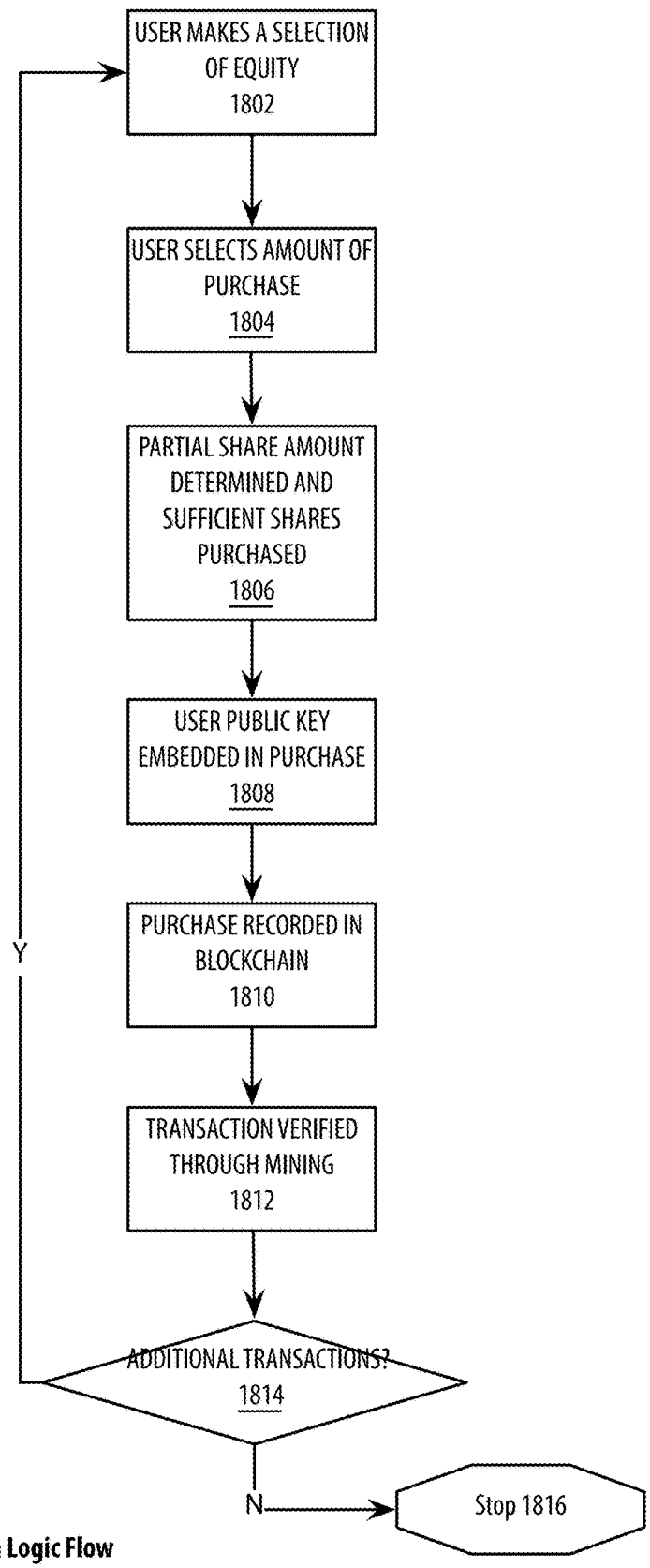
FIG. 18 shows a logic flow diagram illustrating embodiments of a fractional ownership equity purchase process for the SAFETPA.

Referring to FIG. 18, therein is depicted a logic flow diagram illustrating an overview of a fractional ownership equity purchase process performed via the SAFETPA. At the commencement of this process, a user or client make a selection of an equity to be purchased (step 1802). The user selects an amount of share or monetary value of the equity to be purchased (step 1804). The user may be presented with multiple options, such as to buy, sell, option, or trade with respect to the selected equity. Based on the user selections, a partial share amount for the transaction is determined. For example, a request to purchase 0.018559 shares of GOOGLE stock may be recorded in the blockchain as, e.g., "BUY 0.018559 GOOG" and sufficient shares are purchased by the SAFETPA to cover the order along with the orders of any other fractional share owners (step 1806). The user's public key is embedded in the block recording the fractional ownership purchase (step 1808). For example, the public key may be recorded in the blockchain as, e.g., 3J98t1WpEZ73CNmQviecmyiWnmqRhWNLy. Next, at step 1810, the purchase is recorded in a blockchain maintained by the SAFETPA. The transaction may be thereafter verified through mining of the blockchain (step 1812). Finally, at step 1814, the user is asked whether there are any other fractional ownership transactions to be processed. If so, the process returns to step 1802 above. Otherwise, this instance of the process ends (step 1816).

The foregoing steps 1802-1810 are described in more detail below with respect to FIGS. 19-20. The foregoing step 1812 is described in more detail below with respect to FIG. 21.

Figure 19:
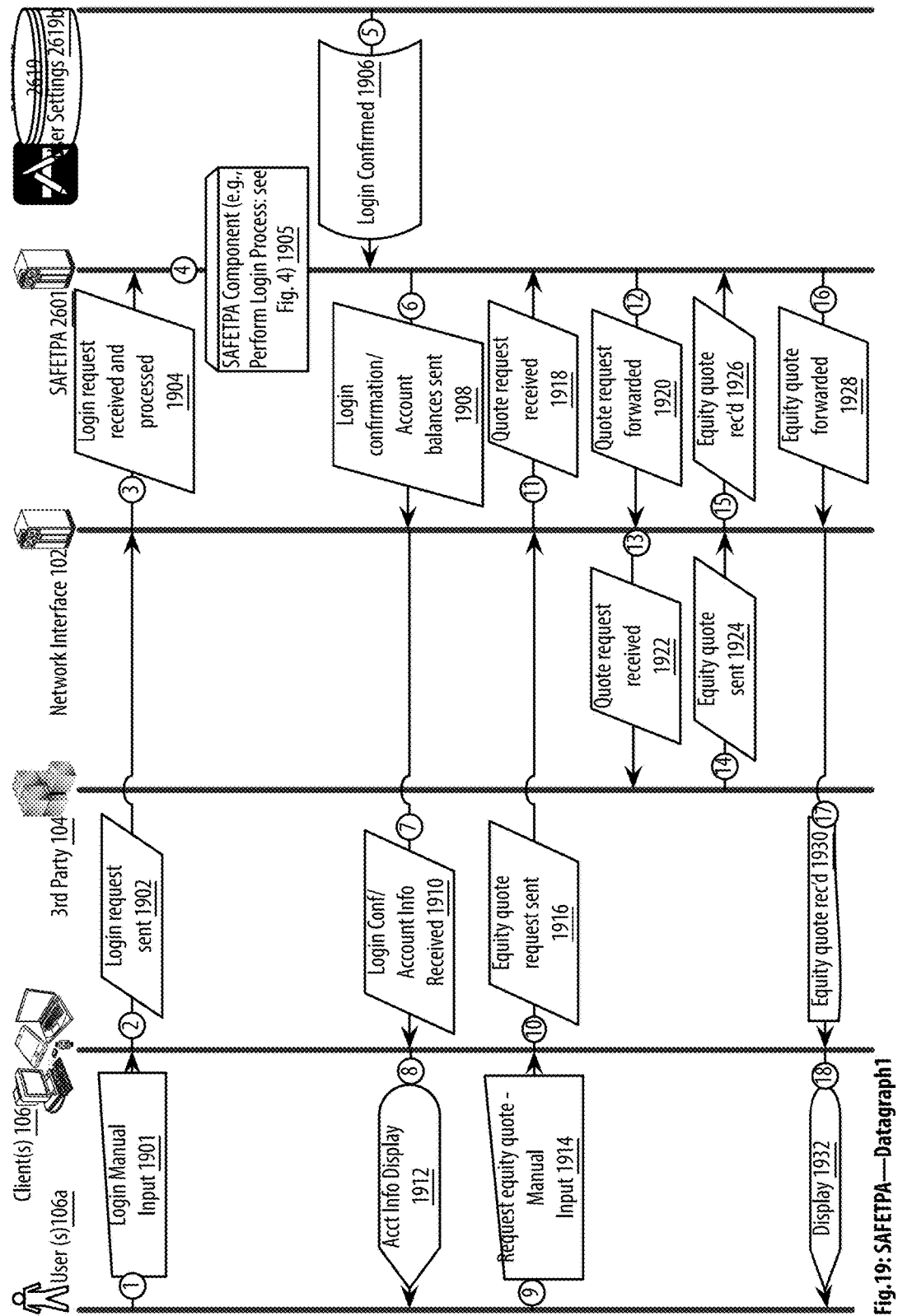
FIG. 19 shows a datagraph diagram illustrating embodiments of an equity research process for the SAFETPA.

Turning to FIG. 19, therein is depicted a datagraph diagram illustrating embodiments of an equity research process for the SAFETPA. This process commences at step 1901 where a client or user 106a using a client terminal 106 accesses the SAFETPA 2601 via the data communications network 100 in order to login. A login request is sent from the client terminal 106 to the SAFETPA 2601 via the data communication network 100 (step 1902). The datastructure of the login request may be of the general same form as previously presented above. The login request is then received and processed by the SAFETPA (step 1904). The SAFETPA then performs a login process, such as that depicted in FIG. 4 above (step 1905), after which the login is confirmed (step 1906).

Upon login confirmation, the SAFETPA retrieves the user's current account balances from, for example, Accounts database 2619a and forwards the account information to the client terminal 106 via the data communication network (step 1908). The querying of the database may include a datastructure in the same general form as discussed in the foregoing for other database retrieval requests. The login confirmation and account information is received by client terminal 106 (step 1910) and displayed to the client 106a on a display device of the client terminal 106 (step 1912).

Next, at step 1914, the client 106a using client terminal 106 may request a quote for the current price of an equity. The datastructure of this request is of the same general form as described above for other database queries. The equity quote request is sent to the SAFETPA by client terminal 106 via the data communications network 100 (step 1916). The quote request is received by the SAFETPA 2601 via network interface servers 102 (step 1918). The SAFETPA then forwarded the quote request to third-party trade execution servers 104 to obtain the current market price for the requested equity (step 1920). The trade execution servers 104 receive the quote request and determines the current price from available market data (step 1922). The equity quote is then sent from trade execution servers 104 to the SAFETPA 2601 via network interface server 102 over the data communication network (step 1924). The SAFETPA 2601 receives and stores the equity quote, for example in Market Feed database 2619z (step 1926). The SAFETPA then forwards the equity quote to the client terminal 106 via the data communications network (step 1928). The equity quote is then received by the client terminal 106 (step 1930) and displayed to the client 106a on a display device thereof (step 1932).

Figure 20:
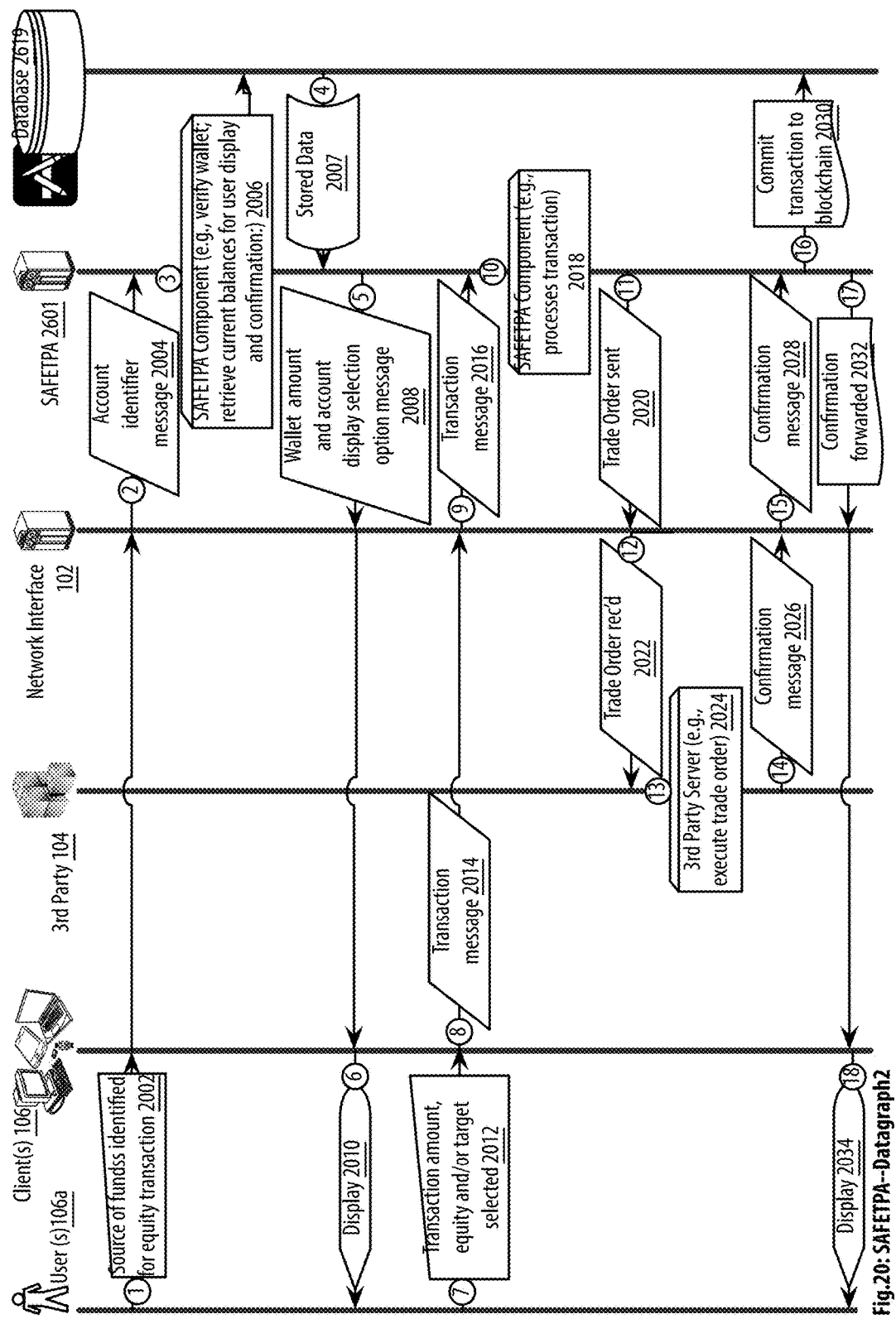
FIG. 20 shows a datagraph diagram illustrating embodiments of a fractional ownership equity transaction process for the SAFETPA.

FIG. 20 shows a datagraph diagram illustrating embodiments of a fractional ownership equity transaction process for the SAFETPA. This process continues from the process of FIG. 19 and commences when a client 1006a using client terminal 106 identifies a source of funds to be used to purchase a fractional share of an equity (step 2002). The source of funds may include a wallet address as described previously above, when the transaction involves payment via a virtual currency. The source of funds may include an identification of a financial account, such as a bank account or an investment account, when the purchase is to be made by real currency, i.e., dollars. The account identified by the client 106a is sent in an account identification message by the client terminal 106 to the SAFETPA 2601 via the data communications network 100 (step 2004). The SAFETPA 2601 then verifies the amount of funds in the wallet or current account balances available for an fractional equity purchase. (step 2006) by retrieve stored wallet/account data for example from Account database 2619a (step 2007). The retrieved wallet or account data is sent to the client terminal 106 via the network interface servers 102 and the data communications network 100 (step 2008). The wallet/account data is ten displayed to the client 106a on a display device of the terminal 106 (step 2010).

Next, at step 2012, the client enters a selection of a transaction or equity purchase amount relating to a target equity to be purchased as part of trade execution request. The trade execution message is sent by the client terminal 106 (step 2014) and then received by the SAFETPA 2601 via the data communication network 100 and the network interface servers 102 (step 2016). The Order Generation Component 2645 of the SAFETPA 2601 then processes the transaction, which may include withdrawing funds from the client's account or virtual wallet prior to execution of the trade order (step 2018). Upon successful processing, the Order Placement Component 2646 of the SAFETPA 2601 sends the trade order to the third party trade execution servers 104 (step 2020). The trade order is received and verified by the servers 104 (step 2022), after which the servers 104 execute the trade order, for example, by placing a corresponding buy/sell order on a market exchange (step 2024). Upon successful execution of the trade order, the trade execution servers 104 transmit a trade confirmation message to the SAFETPA (step 2026). Once the confirmation message is received (step 2028), the Blockchain component 2643 of the SAFETPA 2601 commits the transaction to the blockchain (see, e.g., the process of FIG. 6) (step 2030). The trade order confirmation is then forwarded to the client terminal 106 (step 2032), where it is displayed to the client 106a on a display device thereof. This instance of the process may then terminate.

The exchange and ownership of partial shares is certified via embedding its SHA256 digest in the Bitcoin-like blockchain maintained by the SAFETPA. This is done by generating a special bitcoin-like transaction that contains and encodes a hash value of the transaction data within an OP_RETURN script stored in the block generated by the SAFETPA (see FIGS. 22-25). The OP_RETURN is a scripting opcode that marks the transaction output as provably unspendable and allows a small amount of data to be inserted (for example, 80 bytes), which along with a transaction identification field or the like, becomes part of the block's hash.

Once the transaction is confirmed, the exchange/ownership is permanently certified and proven to exist at least as early as the time the transaction was entered in the blockchain. If the exchange/ownership of partial shares hadn't existed at the time the transaction entered the blockchain, it would have been impossible to embed its digest in the transaction. This is because of the hash function's property of being "second pre-image resistant." Embedding some hash and then adapting a future document to match the hash is also impossible due to the inherent pre-image resistance of hash functions. This is why once the SAFETPA blockchain confirms the transaction generated for the block, its existence is proven, permanently, with no trust required.

Figure 21:
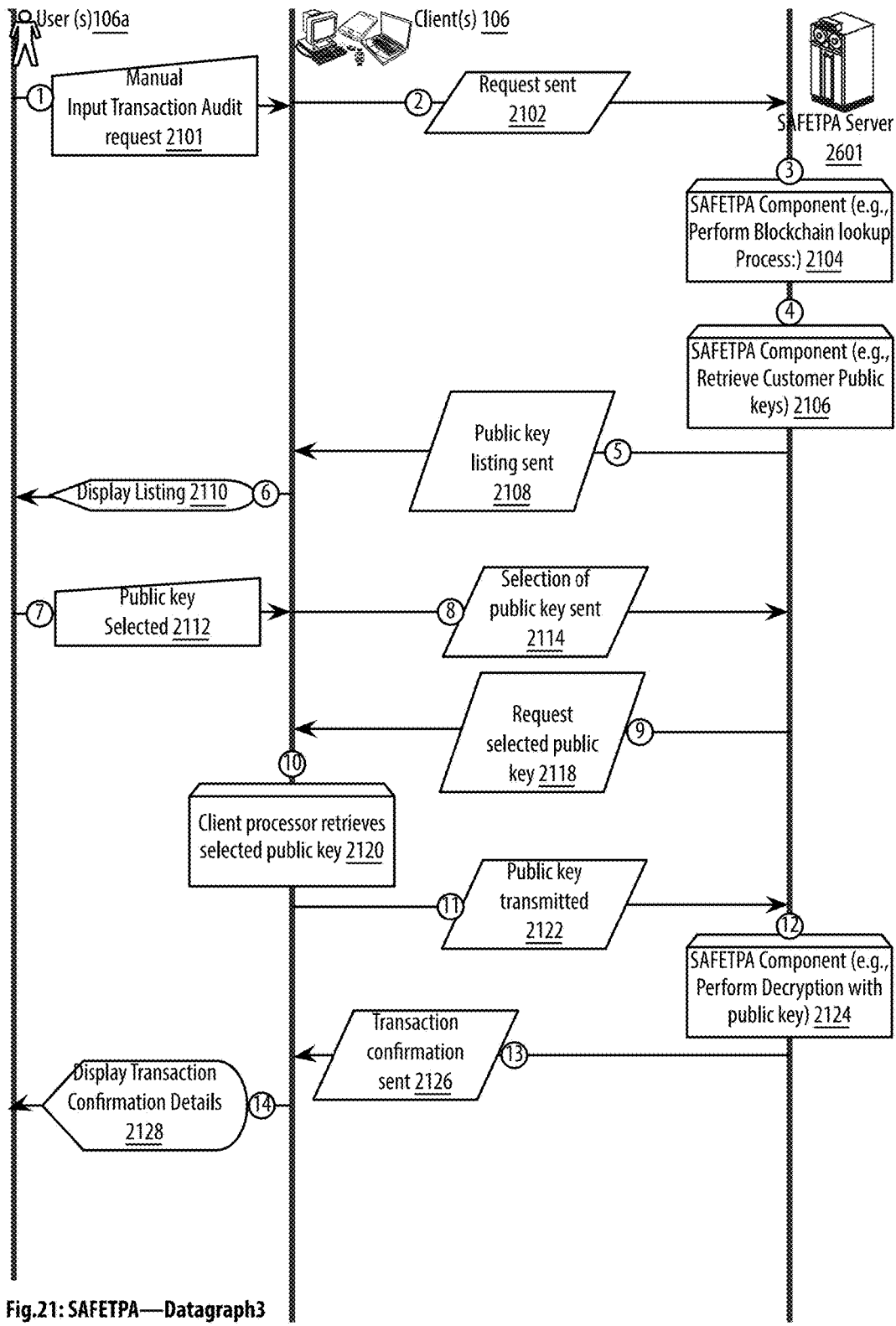
FIG. 21 shows a datagraph diagram illustrating embodiments of an equity ownership audit process for the SAFETPA.

FIG. 21 shows a datagraph diagram illustrating embodiments of an equity ownership audit process for the SAFETPA, by which a blockchain may be searched to prove ownership of one or more fractional shares by any number of clients. This process commences at step 2101 where the client 106a enters an audit request into the client terminal 106. The client terminal forwards the audit request to the SAFETPA (step 2102). The SAFETPA's Blockchain component 2643 commences a blockchain lookup process (step 2104). The SAFETPA's Blockchain Component 2643 retrieves an identification of the client's available public keys (step 2106). The SAFETPA then transmits the public key listing to the client terminal 106 via the data communication network 100 (step 2108). The public key listing is then displayed on the client terminal 106 (step 2110).

Next, at step 2112, the client 106a selects one or more of his/her available public keys via inputs to the client terminal 106. The selection of the public key is transmitted by the client terminal 106 to the SAFETPA 2601 (step 2114). The SAFETPA in turn requests the selected public key from the client terminal 106 (step 2118). The client terminal retrieves the selected public key from its internal memory (step 2120) and forwards it to the SAFETPA (step 2122). The SAFETPA's Blockchain Component 2643 perform decryption of relevant block chain data with the client's selected public key (step 2124). Transaction confirmations corresponding to the public key are retrieved and sent to the client terminal 106 (step 2126), and are then displayed to a client 106a on a display device thereof (step 2128), after which this instance of an audit process ends.

When a client 106 wants to confirm the transaction's existence at the time-stamped time, the following steps are performed as part of the blockchain lookup:

(i) the transaction's SHA256 digest is calculated.

(ii) A transaction in the SAFETPA blockchain containing an OP_RETURN output by which the transaction's hash is searched for.

Some online services like COIN SZECRETS or blockchain.info can easily be used to locate OP_RETURN transactions. The existence of a transaction in the blockchain proves that the document existed at the time the transaction got included into a block.

Figure 22:
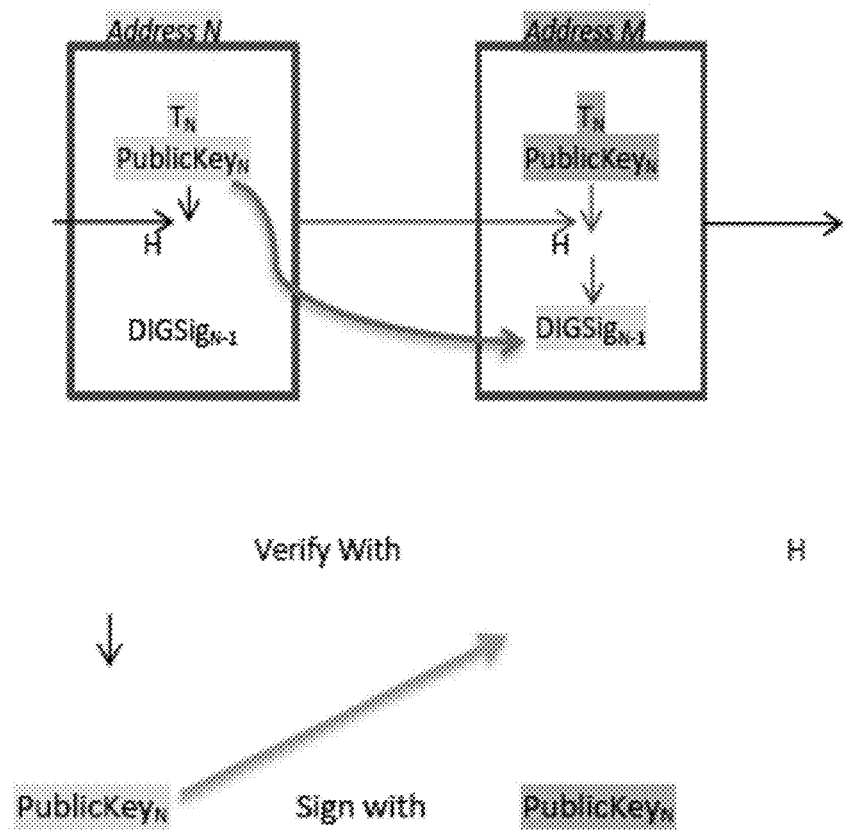
FIG. 22 shows a schematic representation of generating an ownership block for the blockchain maintained by the SAFETPA.

FIG. 22 shows a schematic representation of generating an ownership block for the blockchain maintained by the SAFETPA. SAFETPA's blockchain functionality is based upon elliptic curve cryptography, where addresses are derived from elliptic-curve public keys and transactions authenticated using digital signatures. Elliptic Curve Digital Signature Algorithm (ECDSA) is the cryptographic algorithm used by Bitcoin to ensure that funds are spent by rightful owners. The private key, a single unsigned 256 bit integer of 32 bytes, is essentially a randomly generated 'secret' number, which is known only to the person that generated it. The range of valid private keys is governed by the "secp256k1 ECDSA standard" used by Bitcoin. The public key corresponds to a private key, but does not need to be kept secret.

A public key can be computed from a private key, but it is technologically infeasible to compute the private key from a public key. A public key can thus be used to authenticate or confirm the validity of the digital signature. As shown in FIG. 22, a source address N transfers a payment to destination address M by digitally signing, using its private key, the mathematically generated hash H of prior transaction TN and public key of address M. Also, as shown, the digital signature of address N can be verified by using N's public key without knowing its private key. The SAFETPA block chain contains all such transactions ever executed, wherein each block contains the SHA-256 hash of the previous block.

The elliptic curve over a finite field Fp, with most popular choice being prime fields GF(p) where all arithmetic is performed modulo a prime p, is the set of all pairs (x, y)∈Fp which fulfill E:

$$y^2 x^3 + a.x + b \bmod p$$

together with an imaginary point of infinity O, where p>3 is prime, and a, b∈Fp. The cryptographic signatures used in SAFETPA's blockchain are ECDSA signatures and use the curve 'secp256k1' defined over Fp where $p=2^{256}-2^{32}-977$, which has a 256-bit prime order. This choice deviates from National Institute of Standards and Technology (NIST) recommended "FIPS 186-4" standard in that the curve coefficients are different in order to to speed up scalar multiplication and computations of Pollard's rho algorithm for discrete logarithms.

Given ECDSA public-key K, a Bitcoin address is generated using the cryptographic hash functions SHA-256 and RIPEMD-160:

HASH160=RIPEMD-160(SHA-256(K)).

A SAFETPA address is computed directly from the HASH160 value as illustrated below, where base58 is a binary-to-text encoding scheme:

base58 (0x00||HASH160||[SHA-256(256(SHA-256 (0x00||HASH160))/$2^{224}$])

However, ECDSA signatures may be susceptible to the following potential encryption related vulnerabilities and threats: (i) insufficient or poor randomness when the same public key is used for multiple transactions or the same key pair is used to protect different servers owned by the same entity; (ii) an invalid-curve attack in which an attacker obtains multiples with secret scalars of a point on the quadratic twist, e.g. via fault injection if the point doesn't satisfy the correct curve equation (iii) implementation issues such as side-channel attacks, software bugs, design or implementation flaws; (iv) hardness assumptions about number theoretic problems such as integer factorization and discrete logarithms computation in finite fields or in groups of points on an elliptic curve not applying as assumed in specific contexts. Recent recommendations by RSA SECURITY LLC, about withholding use of Dual Elliptic Curve Deterministic Random Bit Generation (or Dual EC DRBG) and the influence of DRBG compromise on consuming applications, such as DSA, also deserve attention.

A transaction is a signed section of data broadcast to the network and collected into blocks. It typically references prior transaction(s) and assigns a specific transaction value from it to one or more recipient addresses. Transactions are recorded in the network in form of files called blocks. Structures of the block and its corresponding blockheader are shown in FIGS. 23 and 24, respectively.

FIG. 23 shows a schematic representation of the data structure of an equity ownership transaction block in the blockchain maintained by the SAFETPA.

The block may contain the following fields as shown: a "Magic No." field that typically stores a constant and may be limited to 4 bytes in size, a "Block Size" field that typically stores the size in bytes of the current block as a 4 byte value, a "Blockheader" field that is described in more detail below with respect to FIG. 24, a "transaction counter" field that lists the number of transactions stored in the present block and may be limited in size to 1-9 bytes, and a transactions fields that may contain the OP_RETURN code values described previously above.

FIG. 24 shows a schematic representation of the data structure of the blockheader field of the ownership transaction block in the blockchain maintained by the SAFETPA. The blockheader field may contains the following sub-fields: a version field containing a block version number that may be four bytes, a "hashPrevBlock" field containing a 256-bit hash of the previous block in the, a "hashMerkelRoot" field containing a 256-bit hash based on a checksum of all of the transactions within a block, a "timestamp" field containing the time of the transaction, a "bits" field and a "nonce field", containing the current target and a 32-bit number, respectively.

Turning to FIG. 23, a block contains the most recent transactions sent to the network that have not yet been recorded in prior blocks. Each block includes in its blockheader, a record of some or all recent transactions and a reference to the prior block. It also contains the 'answer' to a difficult-to-solve mathematical problem related to the verification of transactions for the block. This problem relates to finding factors of a very large integer, which is computationally difficult to solve but thereafter easy to verify by other nodes once factors are found.

The chain of ownership is created by using a timestamp server that creates and widely publishes a hash of a block of items to be time-stamped, with each timestamp including previous timestamps in its hash value. To prevent double-spending, i.e., ensuring that the BTC payer didn't sign an earlier transaction for same BTC or already spent the BTC, a timestamp server is used to maintain a single chronological history in which each transaction was received. This process ensures that at the time of the transaction, the payee knows that majority of nodes agree to having received the current transaction as the first received. Subsequent transactions for the same BTC don't need to be recorded as they are rejected in the verification process.

Figure 25:
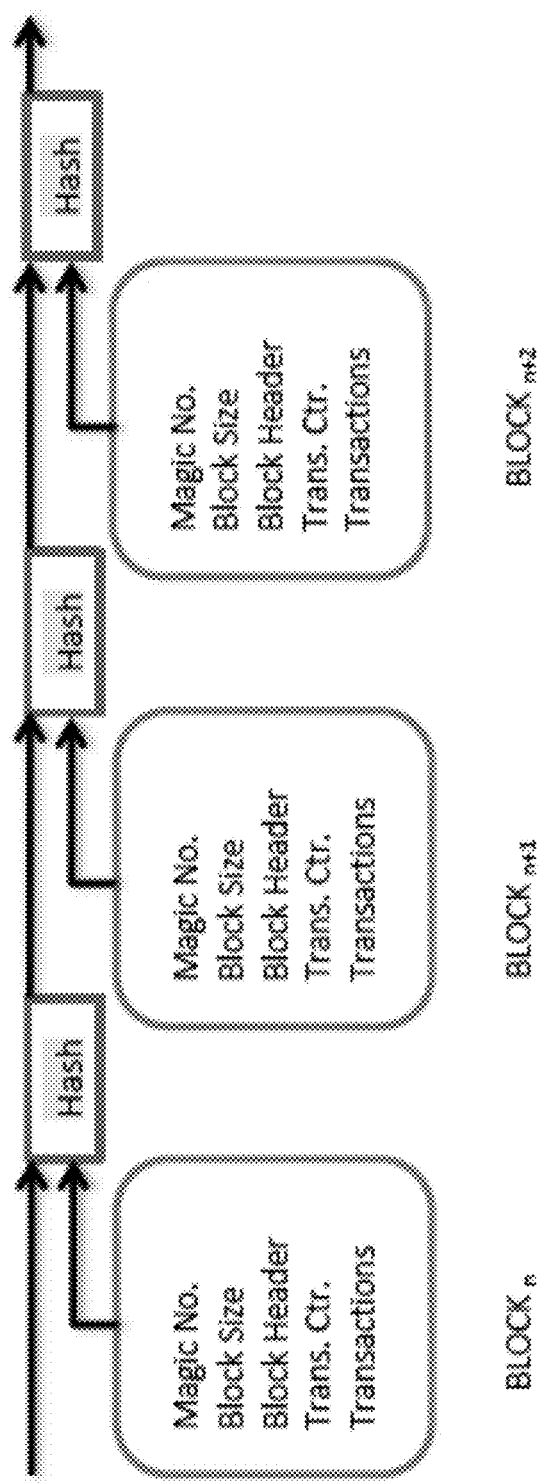
FIG. 25 shows a schematic representation of the creation of a blockchain from individual blocks as maybe performed by the SAFETPA.

FIG. 25 shows a schematic representation of the creation of a blockchain from individual blocks as maybe performed by the SAFETPA. As the only way to confirm absence of a transaction is to maintain a record of all transactions, as seen in FIG. 25, each timestamp includes the previous timestamp in its hash starting from first transaction.

The block chain makes double spending very difficult as each block is preceded by prior block in chronological order as well as is based upon its hash value. To prevent double-spending, i.e., spending of the same BTC twice, public keys and signatures are published as part of publicly available and auditable block chain. To make it infeasible to falsify the blockchain, proof of work (PoW) is used to make addition of each block very costly.

The SAFETPA system provides the following benefits. It gives users a publically verifiable proof of purchase with transparency. The SAFETPA system provides a cost effective mechanism for partial or fractional share purchase, and opens the door to usage of blockchain technology beyond the initial Bitcoin realm.

Controller

FIG. 26 shows a block diagram illustrating embodiments of a controller. In this embodiment, the controller 2601 may serve to aggregate, process, store, search, serve, identify, instruct, generate, match, and/or facilitate interactions with a computer through Guided Target Transactions and Fractional Ownership Transaction Processing technologies, and/or other related data.

Typically, users, which may be people and/or other systems, may engage information technology systems (e.g., computers) to facilitate information processing. In turn, computers employ processors to process information; such processors 2603 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 2629 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the SAFETPA controller 2601 may be connected to and/or communicate with entities such as, but not limited to: one or more users from peripheral devices 2612 (e.g., user input devices 2611); an optional cryptographic processor device 2628; and/or a communications network 2613.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The SAFETPA controller 2601 may be based on computer systems that may comprise, but are not limited to, components such as: a computer systemization 2602 connected to memory 2629.

Computer Systemization

A computer systemization 2602 may comprise a clock 2630, central processing unit ("CPU(s)" and/or "processor(s)" (these terms are used interchangeable throughout the disclosure unless noted to the contrary)) 2603, a memory 2629 (e.g., a read only memory (ROM) 2606, a random access memory (RAM) 2605, etc.), and/or an interface bus 2607, and most frequently, although not necessarily, are all interconnected and/or communicating through a system bus 2604 on one or more (mother)board(s) 2602 having conductive and/or otherwise transportive circuit pathways through which instructions (e.g., binary encoded signals) may travel to effectuate communications, operations, storage, etc. The computer systemization may be connected to a power source 2686; e.g., optionally the power source may be internal. Optionally, a cryptographic processor 2626 may be connected to the system bus. In another embodiment, the cryptographic processor, transceivers (e.g., ICs) 2674, and/or sensor array (e.g., accelerometer, altimeter, ambient light, barometer, global positioning system (GPS) (thereby allowing SAFETPA controller to determine its location), gyroscope, magnetometer, pedometer, proximity, ultra-violet sensor, etc.) 2673 may be connected as either internal and/or external peripheral devices 2612 via the interface bus I/O 2608 (not pictured) and/or directly via the interface bus 2607. In turn, the transceivers may be connected to antenna(s) 2675, thereby effectuating wireless transmission and reception of various communication and/or sensor protocols; for example the antenna(s) may connect to various transceiver chipsets (depending on deployment needs), including Broadcom BCM4329FKUBG transceiver chip (e.g., providing 802.11n, Bluetooth 2.1+EDR, FM, etc.); a Broadcom BCM4752 GPS receiver with accelerometer, altimeter, GPS, gyroscope, magnetometer; a Broadcom BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom BCM43341 transceiver chip (e.g., providing 2G, 3G and 4G LTE cellular communications; 802.11 g/, Bluetooth 4.0, near field communication (NFC), FM radio); an Infineon Technologies X-Gold 618-PMB9800 transceiver chip (e.g., providing 2G/3G HSDPA/HSUPA communications); a MediaTek MT6620 transceiver chip (e.g., providing 802.11a/ac/b/g/n, Bluetooth 4.0 LE, FM, GPS; a Lapis Semiconductor ML8511 UV sensor; a maxim integrated MAX44000 ambient light and infrared proximity sensor; a Texas Instruments WiLink WL1283 transceiver chip (e.g., providing 802.11n, Bluetooth 3.0, FM, GPS); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large super-computer(s) and mainframe(s) computers, down to mini computers, servers, desktop computers, laptops, thin clients (e.g., Chromebooks), netbooks, tablets (e.g., Android, iPads, and Windows tablets, etc.), mobile smartphones (e.g., Android, iPhones, Nokia, Palm and Windows phones, etc.), wearable device(s) (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 2629 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; Apple's A series of processors (e.g., A5, A6, A7, A8, etc.); ARM's application, embedded and secure processors; IBM and/or Motorola's DragonBall and PowerPC; IBM's and Sony's Cell processor; Intel's 80X86 series (e.g., 80386, 80486), Pentium, Celeron, Core (2) Duo, i series (e.g., i3, i5, i7, etc.), Itanium, Xeon, and/or XScale; Motorola's 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the SAFETPA controller and beyond through various interfaces. Should processing requirements dictate a greater amount speed and/or capacity, distributed processors (e.g., see Distributed SAFETPA below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the SAFETPA may be achieved by implementing a microcontroller such as CAST's R8051XC2 microcontroller; Intel's MCS 51 (i.e., 8051 microcontroller); and/or the like. Also, to implement certain features of the SAFETPA, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the SAFETPA component collection (distributed or otherwise) and/or features may be implemented via the microprocessor and/or via embedded components; e.g., via ASIC, coprocessor, DSP, FPGA, and/or the like. Alternately, some implementations of the SAFETPA may be implemented with embedded components that are configured and used to achieve a variety of features or signal processing.

Depending on the particular implementation, the embedded components may include software solutions, hardware solutions, and/or some combination of both hardware/software solutions. For example, SAFETPA features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the SAFETPA features. A hierarchy of programmable interconnects allow logic blocks to be interconnected as needed by the SAFETPA system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the SAFETPA may be developed on regular FPGAs and then migrated into a fixed version that more resembles ASIC implementations. Alternate or coordinating implementations may migrate SAFETPA controller features to a final ASIC instead of or in addition to FPGAs. Depending on the implementation all of the aforementioned embedded components and microprocessors may be considered the "CPU" and/or "processor" for the SAFETPA.

Power Source

The power source 2686 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 2686 is connected to at least one of the interconnected subsequent components of the SAFETPA thereby providing an electric current to all subsequent components. In one example, the power source 2686 is connected to the system bus component 2604. In an alternative embodiment, an outside power source 2686 is provided through a connection across the I/O 2608 interface. For example, a USB and/or IEEE 1394 connection carries both data and power across the connection and is therefore a suitable source of power. Interface Adapters Interface bus(ses) 2607 may accept, connect, and/or communicate to a number of interface adapters, conventionally although not necessarily in the form of adapter cards, such as but not limited to: input output interfaces (I/O) 2608, storage interfaces 2609, network interfaces 2610, and/or the like. Optionally, cryptographic processor interfaces 2627 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 2609 may accept, communicate, and/or connect to a number of storage devices such as, but not limited to: storage devices 2614, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 2610 may accept, communicate, and/or connect to a communications network 2613. Through a communications network 2613, the SAFETPA controller is accessible through remote clients 2633b (e.g., computers with web browsers) by users 2633a. Network interfaces may employ connection protocols such as, but not limited to: direct connect, Ethernet (thick, thin, twisted pair 10/100/ 1000/10000 Base T, and/or the like), Token Ring, wireless connection such as IEEE 802.11a-x, and/or the like. Should processing requirements dictate a greater amount speed and/or capacity, distributed network controllers (e.g., see Distributed SAFETPA below), architectures may similarly be employed to pool, load balance, and/or otherwise decrease/increase the communicative bandwidth required by the SAFETPA controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 2610 may be used to engage with various communications network types 2613. For example, multiple network interfaces may be employed to allow for the communication over broadcast, multicast, and/or unicast networks.

Input Output interfaces (I/O) 2608 may accept, communicate, and/or connect to user, peripheral devices 2612 (e.g., input devices 2611), cryptographic processor devices 2628, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/ g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

Peripheral devices 2612 may be connected and/or communicate to I/O and/or other facilities of the like such as network interfaces, storage interfaces, directly to the interface bus, system bus, the CPU, and/or the like. Peripheral devices may be external, internal and/or part of the SAFETPA controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 2611 often are a type of peripheral device 512 (see above) and may include: card readers, dongles, finger print readers, gloves, graphics tablets, joysticks, keyboards, microphones, mouse (mice), remote controls, security/biometric devices (e.g., fingerprint reader, iris reader, retina reader, etc.), touch screens (e.g., capacitive, resistive, etc.), trackballs, trackpads, styluses, and/or the like.

It should be noted that although user input devices and peripheral devices may be employed, the SAFETPA controller may be embodied as an embedded, dedicated, and/or monitor-less (i.e., headless) device, wherein access would be provided over a network interface connection.

Cryptographic units such as, but not limited to, microcontrollers, processors 2626, interfaces 2627, and/or devices 2628 may be attached, and/or communicate with the SAFETPA controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 2629. However, memory is a fungible technology and resource, thus, any number of memory embodiments may be employed in lieu of or in concert with one another. It is to be understood that the SAFETPA controller and/or a computer systemization may employ various forms of memory 2629. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 2629 will include ROM 2606, RAM 2605, and a storage device 2614. A storage device 2614 may be any conventional computer system storage. Storage devices may include: an array of devices (e.g., Redundant Array of Independent Disks (RAID)); a drum; a (fixed and/or removable) magnetic disk drive; a magneto-optical drive; an optical drive (ie., Blueray, CD ROM/RAM/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 2629 may contain a collection of program and/or database components and/or data such as, but not limited to: operating system component(s) 2615 (operating system); information server component(s) 2616 (information server); user interface component(s) 2617 (user interface); Web browser component(s) 2618 (Web browser); database(s) 2619; mail server component(s) 2621; mail client component(s) 2622; cryptographic server component(s) 2620 (cryptographic server); the SAFETPA component(s) 2635; and/or the like (ie., collectively a component collection). These components may be stored and accessed from the storage devices and/or from storage devices accessible through an interface bus. Although non-conventional program components such as those in the component collection, typically, are stored in a local storage device 2614, they may also be loaded and/or stored in memory such as: peripheral devices, RAM, remote storage facilities through a communications network, ROM, various forms of memory, and/or the like.

Operating System

The operating system component 2615 is an executable program component facilitating the operation of the SAFETPA controller. Typically, the operating system facilitates access of I/O, network interfaces, peripheral devices, storage devices, and/or the like. The operating system may be a highly fault tolerant, scalable, and secure system such as: Apple's Macintosh OS X (Server); AT&T Plan 9; Be OS; Google's Chrome; Microsoft's Windows 7/8; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/Mobile/NT/Vista/XP (Server), Palm OS, and/or the like. Additionally, for robust mobile deployment applications, mobile operating systems may be used, such as: Apple's iOS; China Operating System COS; Google's Android; Microsoft Windows RT/Phone; Palm's WebOS; Samsung/Intel's Tizen; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the SAFETPA controller to communicate with other entities through a communications network 2613. Various communication protocols may be used by the SAFETPA controller as a subcarrier transport mechanism for interaction, such as, but not limited to: multicast, TCP/IP, UDP, unicast, and/or the like.

Information Server

An information server component 2616 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (ie., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTIP request is resolved to a particular information server, the information server resolves requests for information at specified locations on the SAFETPA controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the SAFETPA database 2619, operating systems, other program components, user interfaces, Web browsers, and/or the like.

Access to the SAFETPA database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the SAFETPA. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the SAFETPA as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple's iOS, Macintosh Operating System's Aqua; IBM's OS/2; Google's Chrome (e.g., and other webbrowser/cloud based client OSs); Microsoft's Windows varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 2617 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 2618 is a stored program component that is executed by a CPU. The Web browser may be a conventional hypertext viewing application such as Apple's (mobile) Safari, Google's Chrome, Microsoft Internet Explorer, Mozilla's Firefox, Netscape Navigator, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the SAFETPA enabled nodes. The combined application may be nugatory on systems employing standard Web browsers.

Mail Server

A mail server component 2621 is a stored program component that is executed by a CPU 2603. The mail server may be a conventional Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the SAFETPA. Alternatively, the mail server component may be distributed out to mail service providing entities such as Google's cloud services (e.g., Gmail and notifications may alternatively be provided via messenger services such as AOL's Instant Messenger, Apple's iMessage, Google Messenger, SnapChat, etc.).

Access to the SAFETPA mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 2622 is a stored program component that is executed by a CPU 2603. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 2620 is a stored program component that is executed by a CPU 2603, cryptographic processor 2626, cryptographic processor interface 2627, cryptographic processor device 2628, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the SAFETPA may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the SAFETPA component to engage in secure transactions if so desired. The cryptographic component facilitates the secure accessing of resources on the SAFETPA and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The SAFETPA Database

The SAFETPA database component 2619 may be embodied in a database and its stored data. The database is a stored program component, which is executed by the CPU; the stored program component portion configuring the CPU to process the stored data. The database may be a conventional, fault tolerant, relational, scalable, secure database such as MySQL, Oracle, Sybase, etc. may be used. Additionally, optimized fast memory and distributed databases such as IBM's Netezza, MongoDB's MongoDB, opensource Hadoop, opensource VoltDB, SAP's Hana, etc. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the SAFETPA database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the SAFETPA database is implemented as a data-structure, the use of the SAFETPA database 2619 may be integrated into another component such as the SAFETPA component 2635. The CETPA database may likewise be stored in the Blockchain or similar format. Also, the database may be implemented as a mix of data structures, objects, and relational structures. Databases may be consolidated and/or distributed in countless variations (e.g., see Distributed SAFETPA below). Portions of databases, e.g., tables, may be exported and/or imported and thus decentralized and/or integrated.

In one embodiment, the database component 2619 includes several tables 2619*a-h:*

An accounts table 2619*a* includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 2619*b* includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a SAFETPA);

An devices table 2619*c* includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceSession, authKey, deviceSecureKey, walletAppInstalledFlag, deviceAccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 2619*d* includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

An assets table 2619*e* includes fields such as, but not limited to: assetID, accountID, userID, distributorAccountID, distributorPaymentID, distributorOnwerID, assetOwnerID, assetType, assetSourceDeviceID, assetSourceDeviceType, assetSourceDeviceName, assetSourceDistributionChannelID, assetSourceDistributionChannelType, assetSourceDistributionChannelName, assetTargetChannelID, assetTargetChannelType, assetTargetChannelName, assetName, assetSeriesName, assetSeriesSeason, assetSeriesEpisode, assetCode, assetQuantity, assetCost, assetPrice, assetValue, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, subscriptionIDs, assetAuthroizationCode, assetAccessPrivileges, assetPreferences, assetRestrictions, assetAPI, assetAPIconnectionAddress, and/or the like;

A payments table 2619*f* includes fields such as, but not limited to: paymentID, accountID, userID, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 2619*g* includes fields such as, but not limited to: transactionID, accountID, assetIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table 2619*h* includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAccessPrivileges, merchantPreferences, merchantRestrictions, and/or the like;

An ads table 2619*i* includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisherAddress, publisherURL, publisherTag, publisherIndustry, publisherName, publisherDescription, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like.

A blockchain table 2619*j* includes fields such as, but not limited to: block(1) . . . block(n). The blockchain table 1819*j* may be used to store blocks that form blockchains of transactions as described herein.

A public key table 2619*k* includes fields such as, but not limited to: accountID, accountOwnerID, accountContactID, public_key. The public key table 1819*k* may be used to store and retrieve the public keys generated for clients of the SAFETPA system as described herein.

A private key table table 2619l includes fields such as, but not limited to: ownerID, OwnertContact, private_key. The private keys held here will not be the private keys of registered users of the SAFETPA system, but instead will be used to authentic transactions originating from the SAFETPA system.

An OpReturn table 2619*m* includes fields such as, but not limited to: transactionID, OpReturn_Value1 . . . OpReturn_Value80; where each OpReturn Value entry stores one byte in the OpReturn field for the purposes described above.

A wallet table 2619*n* includes fields such as, but not limited to: an accountID, accountOwnerID, accountContactID, transactionIDs, SourceAddress(1) . . . SSourceAddress(n), BalanceAddress(1) . . . Balance address(n). The wallet table 1819*n* may be used to store wallet information as described in the foregoing.

A market_data table 2619*z* includes fields such as, but not limited to: market_data_feed_ID, asset_ID, asset_symbol, asset_name, spot_price, bid_price, ask_price, and/or the like; in one embodiment, the market data table is populated through a market data feed (e.g., Bloomberg's PhatPipe, Consolidated Quote System (CQS), Consolidated Tape Association (CTA), Consolidated Tape System (CTS), Dun & Bradstreet, OTC Montage Data Feed (OMDF), Reuter's Tib, Triarch, US equity trade and quote market data, Unlisted Trading Privileges (UTP) Trade Data Feed (UTDF), UTP Quotation Data Feed (UQDF), and/or the like feeds, e.g., via ITC 2.1 and/or respective feed protocols), for example, through Microsoft's Active Template Library and Dealing Object Technology's real-time toolkit Rtt.Multi.

In one embodiment, the SAFETPA database 2619 may interact with other database systems. For example, employing a distributed database system, queries and data access by search SAFETPA component may treat the combination of the SAFETPA database, an integrated data security layer database as a single database entity (e.g., see Distributed SAFETPA below).

In one embodiment, user programs may contain various user interface primitives, which may serve to update the SAFETPA. Also, various accounts may require custom database tables depending upon the environments and the types of clients the SAFETPA may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 2619*a*-*z*. The SAFETPA may be configured to keep track of various settings, inputs, and parameters via database controllers.

The SAFETPA database may communicate to and/or with other components in a component collection, including itself, and/or facilities of the like. Most frequently, the SAFETPA database communicates with the SAFETPA component, other program components, and/or the like. The database may contain, retain, and provide information regarding other nodes and data.

The SAFETPAs

The component 2635 is a stored program component that is executed by a CPU. In one embodiment, the SAFETPA component incorporates any and/or all combinations of the aspects of the SAFETPA that was discussed in the previous figures. As such, the SAFETPA affects accessing, obtaining and the provision of information, services, transactions, and/or the like across various communications networks. The features and embodiments of the SAFETPA discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the SAFETPA's features and facilities, and in many cases reduce the costs, energy consumption/requirements, and extend the life of SAFETPA's underlying infrastructure; this has the added benefit of making the SAFETPA more reliable. Similarly, many of the features and mechanisms are designed to be easier for users to use and access, thereby broadening the audience that may enjoy/employ and exploit the feature sets of the SAFETPA; such ease of use also helps to increase the reliability of the SAFETPA. In addition, the feature sets include heightened security as noted via the Cryptographic components 2620, 2626, 2628 and throughout, making access to the features and data more reliable and secure The SAFETPA transforms virtual wallet addresses or fractional order purchase request inputs, via SAFETPA components (e.g., Virtual Currency Component, Blockchain Component, Transaction Confirmation Component), into transaction confirmation outputs.

The SAFETPA component enabling access of information between nodes may be developed by employing standard development tools and languages such as, but not limited to: Apache components, Assembly, ActiveX, binary executables, (ANSI) (Objective–) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; scriptaculo.us; Simple Object Access Protocol (SOAP); SWFObject; Yahoo! User Interface; and/or the like), WebObjects, and/or the like. In one embodiment, the SAFETPA server employs a cryptographic server to encrypt and decrypt communications. The SAFETPA component may communicate to and/or with other components in a component collection, including itself, and/or facilities of the like. Most frequently, the SAFETPA component communicates with the SAFETPA database, operating systems, other program components, and/or the like. The SAFETPA may contain, communicate, generate, obtain, and/or provide program component, system, user, and/or data communications, requests, and/or responses.

A Login Component 2641 is a stored program component that is executed by a CPU. In various embodiments, the Login Component 2641 incorporates any and/or all combinations of the aspects of logging into the SAFETPA that was discussed above with respect to FIG. 4.

A Virtual Currency Transaction Component 2642 is a stored program component that is executed by a CPU. In various embodiments, the Virtual Currency Transaction Component 2642 incorporates any and/or all combinations of the aspects of the SAFETPA that was discussed above with respect to FIG. 5.

A Blockchain Component 643 is a stored program component that is executed by a CPU. In one embodiment, the Blockchain Component 2643 incorporates any and/or all combinations of the aspects of the SAFETPA that was discussed in the previous figures.

A Transaction Confirmation Component 2644 is a stored program component that is executed by a CPU. In one embodiment, the Transaction Confirmation Component 1844 incorporates any and/or all combinations of the aspects of the SAFETPA that was discussed above with respect to FIGS. 5 and 7.

An Order Generation Component 2645 and an Order Placement Component 264 provide the functionalities as listed above for the SAFETPA.

Distributed SAFETPAs

The structure and/or operation of any of the SAFETPA node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such a combination of hardware may be distributed within a location, within a region and/or globally where logical access to a controller may be abstracted as a singular node, yet where a multitude of private, semiprivate and publically accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access).

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the SAFETPA controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services, Microsoft Azure, Hewlett Packard Helion, IBM Cloud services allow for SAFETPA controller and/or SAFETPA component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (SON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c –post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the SAFETPA controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address='192.168.8.188';
$port=255;
// create a server-side SSL socket, listen for/accept incoming communication
$sock=socket_create(AF_INET, SOCK_STREAM, 0);
socket_bind($sock, $address, $port) or die('Could not bind to address');
socket_listen($sock);
$client=socket_accept($sock);
// read input data from client device in 1024 byte blocks until end of message
do {
  $input=" ";
  $input=socket_read($client, 1024);
  $data.=$input;
} while($input !=" ");
// parse data to extract variables
$obj=json_decode($data, true);
// store input data in a database
mysql_connect("281.488.185.132",$DBserver,$password); // access database server
mysql_select("CLIENT_DB.SQL"); // select database to append
mysql_query("INSERT INTO UserTable (transmission) VALUES ($data)"); // add data to UserTable table in a CLIENT database
mysql_close("CLIENT_DB.SQL"); // close connection to database
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

In order to address various issues and advance the art, the entirety of this application for Social Aggregated Fractional Equity Transaction Partitioned Acquisition Apparatuses, Methods and Systems, (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower," "upper," "horizontal," "vertical," "above," "below," "up," "down," "top" and "bottom" as well as derivative thereof (e.g., "horizontally," "downwardly," "upwardly," etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached," "affixed," "connected," "coupled," "interconnected," and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a individual and/or enterprise user, database configuration and/or relational model, data type, data transmission and/or network framework, syntax structure, and/or the like, various embodiments of the SAFETPA, may be implemented that enable a great deal of flexibility and customization. For example, aspects of the may be adapted for monetary and non-monetary transactions. While various embodiments and discussions of the have included Guided Target Transactions and Fractional Ownership Transaction Processing, however, it is to be understood that the embodiments described herein may be readily configured and/or customized for a wide variety of other applications and/or implementations.

What is claimed is:

1. A fractional ownership transaction processing apparatus, comprising:
   a memory;
   a component collection in the memory, including
      a Fractional Order Generation component,
      a Fractional Order Placement component; and
      a BlockChain Recordation component;
   a processor disposed in communication with the memory, and configured to issue a plurality of processing instructions from the component collection stored in the memory,
      wherein the processor issues instructions from the Fractional Order Generation component, stored in the memory, to:
         receive a fractional order purchase request datastructure, wherein the fraction order purchase request datastructure includes a value for a fractional order of an equity, and wherein the fractional order purchase request data structure is received via a data communication network interface from a client terminal of a client having a source of funds and having a public encryption key,
         determine a purchase price for the fractional order of the equity by retrieving a quote for a price of a share of the equity;
         confirm that the source of funds contains at least the purchase price; and
         generate a trade order for the share of the equity;
      wherein the processor issues instructions from the Fractional Order Placement component, stored in the memory, to:
         obtain the trade order from Fractional Order Generation Component,
         transmit the trade order to a trade execution server via the data communication network; and
         receive a confirmation of an execution of the trade order from the trade execution server via the data communication network;
      wherein the processor issues instructions from the Blockchain Recordation Component, stored in the memory, to:
         receive the confirmation from the Fractional Order Placement Component;
         record the confirmation, the fractional share and the public key of the client in a block data structure;
         record the block data structure in a blockchain, wherein each block data structure of the blockchain comprises a hash of a prior block data structure in the blockchain in order to secure the blockchain from tampering, and
         transmit the confirmation to the client terminal via the data communication network for display to the client.

2. The apparatus of claim 1, wherein the block data structure comprises a plurality of fractional equity order transactions from a plurality of clients.

3. The apparatus of claim 1, further, comprising:
   the processor issues instructions from the Blockchain Recordation component, stored in the memory, to withdrawal the purchase price from the source of funds of the client.

4. The apparatus of claim 3, wherein the source of funds comprises a real currency.

5. The apparatus of claim 3, wherein the source of funds comprises a virtual currency.

6. The apparatus of claim 1, wherein the equity comprises at least one of: a stock listed on a stock exchange, a corporate stock, a mutual fund, an exchange traded fund and an equity portfolio comprising a plurality of equities and/or equity types.

7. A processor-readable fractional ownership transaction processing medium storing processor-executable components, the components, comprising
   a component collection stored in the medium, including
      a Fractional Order Generation component,
      a Fractional Order Placement component; and
      a BlockChain Recordation component;
      wherein the Fractional Order Generation component, stored in the medium, includes processor-issuable instructions to:
         receive a fractional order purchase request datastructure, wherein the fraction order purchase request datastructure includes a value for a fractional order of an equity, and wherein the fractional order purchase request data structure is received via a data communication network interface from a client terminal of a client having a source of funds and having a public encryption key,
         determine a purchase price for the fractional order of the equity by retrieving a quote for a price of a share of the equity;
         confirm that the source of funds contains at least the purchase price; and
         generate a trade order for the share of the equity;
      wherein the Fractional Order Placement component, stored in the medium, includes processor-issuable instructions to:
         obtain the trade order from Fractional Order Generation Component,
         transmit the trade order to a trade execution server via the data communication network; and
         receive a confirmation of an execution of the trade order from the trade execution server via the data communication network;
      wherein the BlockChain Recordation component, stored in the medium, includes processor-issuable instructions to:
         receive the confirmation from the Fractional Order Placement Component;
         record the confirmation, the fractional share and the public key of the client in a block data structure;
         record the block data structure in a blockchain, wherein each block data structure of the blockchain comprises a hash of a prior block data structure in the blockchain in order to secure the blockchain from tampering, and
         transmit the confirmation to the client terminal via the data communication network for display to the client.

8. The medium of claim 7, wherein the block data structure comprises a plurality of fractional equity order transactions from a plurality of clients.

9. The apparatus of claim 7, further, comprising:
the processor issues instructions from the Blockchain Recordation component, stored in the memory, to withdrawal the purchase price from the source of funds of the client.

10. The medium of claim 9, wherein the source of funds comprises a real currency.

11. The medium of claim 9, wherein the source of funds comprises a virtual currency.

12. The medium of claim 7, wherein the equity comprises at least one of:
a stock listed on a stock exchange, a corporate stock, a mutual fund, an exchange traded fund and an equity portfolio comprising a plurality of equities and/or equity types.

13. A processor-implemented fractional ownership transaction processing system, comprising:
a Fractional Order Generation component means, to:
receive a fractional order purchase request datastructure, wherein the fraction order purchase request datastructure includes a value for a fractional order of an equity, and wherein the fractional order purchase request data structure is received via a data communication network interface from a client terminal of a client having a source of funds and having a public encryption key,
determine a purchase price for the fractional order of the equity by retrieving a quote for a price of a share of the equity;
confirm that the source of funds contains at least the purchase price; and
generate a trade order for the share of the equity;
a Fractional Order Placement component means, to:
obtain the trade order from Fractional Order Generation Component,
transmit the trade order to a trade execution server via the data communication network; and
receive a confirmation of an execution of the trade order from the trade execution server via the data communication network;
a Blockchain Recordation component means, to:
receive the confirmation from the Fractional Order Placement Component;
record the confirmation, the fractional share and the public key of the client in a block data structure;
record the block data structure in a blockchain, wherein each block data structure of the blockchain comprises a hash of a prior block data structure in the blockchain in order to secure the blockchain from tampering, and
transmit the confirmation to the client terminal via the data communication network for display to the client.

14. The system of claim 13, wherein the block data structure comprises a plurality of fractional equity order transactions from a plurality of clients.

15. The system of claim 13, further, comprising:
the processor issues instructions from the Blockchain Recordation component, stored in the memory, to withdrawal the purchase price from the source of funds of the client.

16. The system of claim 15, wherein the source of funds comprises a real currency.

17. The system of claim 15, wherein the source of funds comprises a virtual currency.

18. The system of claim 13, wherein the equity comprises at least one of:
a stock listed on a stock exchange, a corporate stock, a mutual fund, an exchange traded fund and an equity portfolio comprising a plurality of equities and/or equity types.

19. A processor-implemented fractional ownership transaction processing method, comprising
executing processor-implemented Fractional Order Generation component instructions to:
receive a fractional order purchase request datastructure, wherein the fraction order purchase request datastructure includes a value for a fractional order of an equity, and wherein the fractional order purchase request data structure is received via a data communication network interface from a client terminal of a client having a source of funds and having a public encryption key,
determine a purchase price for the fractional order of the equity by retrieving a quote for a price of a share of the equity;
confirm that the source of funds contains at least the purchase price; and
generate a trade order for the share of the equity;
executing processor-implemented Fractional Order Placement component instructions to:
obtain the trade order from Fractional Order Generation Component,
transmit the trade order to a trade execution server via the data communication network; and
receive a confirmation of an execution of the trade order from the trade execution server via the data communication network;
executing processor-implemented Blockchain Recordation component instructions to:
receive the confirmation from the Fractional Order Placement Component;
record the confirmation, the fractional share and the public key of the client in a block data structure;
record the block data structure in a blockchain, wherein each block data structure of the blockchain comprises a hash of a prior block data structure in the blockchain in order to secure the blockchain from tampering, and
transmit the confirmation to the client terminal via the data communication network for display to the client.

20. The method of claim 19, wherein the block data structure comprises a plurality of fractional equity order transactions from a plurality of clients.

21. The method of claim 19, further, comprising:
the processor issues instructions from the Blockchain Recordation component, stored in the memory, to withdrawal the purchase price from the source of funds of the client.

22. The method of claim 21, wherein the source of funds comprises a real currency.

23. The method of claim 21, wherein the source of funds comprises a virtual currency.

24. The method of claim 19, wherein the equity comprises at least one of:
a stock listed on a stock exchange, a corporate stock, a mutual fund, an exchange traded fund and an equity portfolio comprising a plurality of equities and/or equity types.

25. A fractional ownership transaction processing system, comprising
means for receiving a fractional order purchase request datastructure, wherein the fraction order purchase request datastructure includes a value for a fractional order of an equity, and wherein the fractional order purchase request data structure is received via a data communication network interface from a client terminal of a client having a source of funds and having a public encryption key, means for determining a purchase price for the fractional order of the equity by retrieving a quote for a price of a share of the equity;

means for confirming that the source of funds contains at least the purchase price; and means for generating a trade order for the share of the equity;

means for transmitting the trade order to a trade execution server via the data communication network;

means for receiving a confirmation of an execution of the trade order from the trade execution server via the data communication network;

means for recording the confirmation, the fractional share and the public key of the client in a block data structure;

means for recording the block data structure in a blockchain, wherein each block data structure of the blockchain comprises a hash of a prior block data structure in the blockchain in order to secure the blockchain from tampering; and means for transmitting the confirmation to the client terminal via the data communication network for display to the client.

26. The system of claim 25, wherein the block data structure comprises a plurality of fractional equity order transactions from a plurality of clients.

27. The system of claim 25, further, comprising:

the processor issues instructions from the Blockchain Recordation component, stored in the memory, to withdrawal the purchase price from the source of funds of the client.

28. The system of claim 27, wherein the source of funds comprises a real currency.

29. The system of claim 27, wherein the source of funds comprises a virtual currency.

30. The system of claim 25, wherein the equity comprises at least one of:

a stock listed on a stock exchange, a corporate stock, a mutual fund, an exchange traded fund and an equity portfolio comprising a plurality of equities and/or equity types.

* * * * *